Sept. 6, 1966 J. L. CRAFT ETAL 3,271,743

ANALYTIC BOUNDS DETECTOR

Filed Dec. 31, 1962

8 Sheets-Sheet 1

INVENTORS
JOHN L. CRAFT
WARREN B. STROHM
BY Ronald L. Kranzdorf
AGENT

Sept. 6, 1966 J. L. CRAFT ETAL 3,271,743

ANALYTIC BOUNDS DETECTOR

Filed Dec. 31, 1962

8 Sheets-Sheet 5

Sept. 6, 1966 J. L. CRAFT ETAL 3,271,743

ANALYTIC BOUNDS DETECTOR

Filed Dec. 31, 1962 8 Sheets-Sheet 6

Sept. 6, 1966 J. L. CRAFT ETAL 3,271,743

ANALYTIC BOUNDS DETECTOR

Filed Dec. 31, 1962 8 Sheets-Sheet 8

3,271,743

ANALYTIC BOUNDS DETECTOR

John L. Craft, Beacon, and Warren B. Strohm, Hopewell Junction, N.Y., assignors to International Business Machines Corporation, New York, N.Y., a corporation of New York Filed Dec. 31, 1962, Ser. No. 248,379
10 Claims. (Cl. 340—172.5)

This invention relates generally to a circuit for processing coded information notations such as language, and more particularly to a circuit for establishing the analytic bounds in a continuous stream of such coded notations.

The processing of a continuous sequence of coded input data by mechanical means is generally accomplished in discrete steps, the continuous stream of input data being broken down into logical segments for the processing operation. With language processing, for example language translation, the continuous stream of input text is generally broken down into sentences, which sentences, are individually processed. Heretofore, it has been the practice to have the text which is to be processed manually typed or key punched into the mechanical processor and, during this operation, to indicate to the machine, in some suitable manner, the end of each sentence. However, where large volumes of text are to be processed, as is generally the case with any practical application of machine language processing, such manual entry of information into the machine is both slow and costly. For the potential of these automatic language processing machines to be realized, it is almost essential that the input text be mechanically scanned and read into the machine.

One suggestion for accomplishing the sentence-boundary determination with a mechanical input to the language processing machine is to have the text to be processed pre-edited by an individual knowledgeable in the language in which the text is written. This again is a time consuming and extremely expensive procedure.

It would appear, at first glance, that there would be no problem in adapting a machine to recognize the end of a sentence since a sentence is always terminated by either a period, a question mark, or exclamation point. (There is a possibility that a quotation mark preceded by one of the above marks will be used to end a sentence.) However, particularly with a period, the mere presence of such a terminal-type punctuation does not necessarily indicate the end of a sentence. For example, a period may be used to indicate an abbreviation or it may be used as a decimal point. Also, a period, question mark, or exclamation point, could be used as part of a short quotation appearing in a longer sentence. The problem is further complicated by the fact a sentence may, for example, end with an abbreviation or with a short quotation. Therefore, the mere detection of an abbreviation does not conclusively indicate that the period following it is not also being used to end a sentence. Since, particularly with more advanced language translation schemes, it is necessary that the machine operate on a complete sentence, some means must be provided to determine whether or not a terminal-type punctuation detected in a stream of text indicates the end of a sentence.

It is, therefore, the primary object of this invention to provide an automatic means for accurately determining the end of an information unit in a sequence of coded input data.

A more specific object of this invention is to provide a circuit for determining the end of a sentence in a continuous stream of input text.

A further object of this invention is to provide a circuit for determining whether a terminal-type punctuation appearing in a continuous stream of input text indicates the end of a sentence or has some other significance.

Still another object of this invention is to provide a circuit for determining whether a terminal-type punctuation which is being used for some purpose other than to end a sentence is also being used to end a sentence.

A further object of this invention is to provide means for accomplishing the above objects without causing an appreciable increase in the time required to process the coded input data.

In accordance with these objects, this invention provides a storage means to the successive positions of which the coded input-data sequence is normally applied. Means are also provided for detecting an end-of-unit symbol in the data applied to the storage means. When an end-of-unit symbol is detected, means are energized to cause a predetermined number of input symbols following the detected end-of-unit symbol to be applied to successive positions in the storage means and for then preventing other input data from being applied to the storage means. In a preferred embodiment of the invention, the input data is fed into the storage means through an n-position shift register, the scan for an end-of-unit symbol being made at the last stages of the shift register. When an end-of-unit symbol is detected, the remaining symbols in the shift register are cycled into the storage means.

A second storage means is also provided for storing, in a systematic order, a table having an entry representing each possible form in which an end-of-unit symbol may appear with the symbols before and after it. The symbols stored in the first storage means are then compared symbol by symbol with the symbols stored in the table. When a match is detected between certain symbols, including an end-of-unit symbol, in said storage means and one of a first plurality of entries in said table, means are activated to indicate the end of an information unit. Conversely, when a match is detected between symbols, including an end-of-unit symbol, in the storage means and one of a second plurality of entries in the table, means are activated to indicate that the detected end-of-unit symbol did not end an information unit and that additional input data should be applied to said device. Means are also provided to make, in some cases, a further comparison when a match is made with one of said second plurality of entries to determine if the detected end-of-unit symbol is also being used to end an information unit.

The foregoing and other objects, features, and advantages of the invention will be apparent from the following more particular description of a preferred embodiment of the invention, as illustrated in the accompanying drawings.

FIG. 1 is a general schematic diagram showing the major elements in a preferred embodiment of the invention.

FIG. 2 indicates the arrangement of FIGS. 2A–2B to form a composite flow diagram of the circuit of this invention.

FIGS. 2A–2B when taken together form a flow diagram of the circuit of this invention.

FIG. 3 indicates the arrangement of FIGS. 3A–3D to form a composite detailed schematic of the circuit which is a preferred embodiment of this invention.

FIGS. 3A–3D when taken together, form a detailed circuit schematic of a preferred embodiment of the invention.

FIG. 4 is a block diagram of a scan-control circuit suitable for use with the circuit shown in FIGS. 1 and 3C.

GENERAL DESCRIPTION

The following general description will be with reference to a sentence-termination determinator which is being used in conjunction with a machine language processing device. While this is the preferred embodiment of the invention, it is to be understood that the invention is not limited to such an application and may be used wherever a similar problem arises in any device for automatically processing coded information.

Referring to FIG. 1, there is shown, in diagrammatic form, the major elements of a sentence-termination detection device as it would be used in a machine language processor and the relationship of these major elements to each other. For the sake of simplicity and clarity, most of the control elements and signals necessary to achieve a completely operative device have been omitted from this figure. A completely operative device is shown in the detailed schematic diagram of FIGS. 3A–3D.

The device shown in FIG. 1 has three different operating states which states will be designated the load-input state, the search-input state, and the not-in-use state. The circuit is in the not-in-use state not only when the language processing device is turned off, but also when the sentence-determination-detection operation has been completed and the sentence which has been stored is being operated upon by the information processing device. Assume that the device shown in FIG. 1 is initially in the not-in-use state.

A signal applied to OR gate 10 from either start terminal 11 or return-to-load-input-state line 13 causes an output on line 12 to (a) switch state-control circuit 14 to the load-input state; (b) switch flip-flop 15 to its OFF state, and (c) start the decrementing of counter 16. The output from OR gate 10 is also passed along line 17 to start input device 18. The only limitation on the input device is that it be capable of stopping on any input character. A paper tape reader or an incremental magnetic tape reader are examples of suitable input devices. The input device feeds information a byte at a time into an *n*-byte shift register 20. For the purposes of the following description, each byte will be considered to be made up of six binary bits. Shift register 20 will be referred to in the following description, as the edit register and the individual stages of this register will be referred to as the ER–1 stage, ER–2 stage, . . . ER–(*n*–1) stage, ER–*n* stage. Bytes are applied by the input device to the ER–*n* stage of the edit register and are shifted out from the ER–1 stage of the register to line 22. Line 22 is connected through feedback line 24 and AND gate 26 to the ER–*n* stage. Line 22 is also connected through line 28 and AND gate 30 to an addressable storage device 32 and, through a line 34 to a serializer 36. The addressable store 32, which may, for example, be a magnetic core matrix array, has a prefix region 38, the significance of which will become apparent later. The address at which information is stored in addressable store 32 is controlled by a memory address selector 40. The memory address selector is controlled primarily by state-control circuit 14; the other inputs to this circuit will be described later.

The contents of the ER–1 and ER–2 stages of register 20 are continuously sampled by a terminal-type punctuation detector 42. In this embodiment of the invention, it has been assumed that a two-byte code is used to represent a terminal-type punctuation. This is the reason that two-byte positions of the edit register are sampled to detect a terminal-type punctuation. A different coding scheme would lead to obvious variations in the punctuation detector.

When a terminal-type punctuation is detected by detector 42, the edit register is shifted one more time, and a signal appears on line 44 which then (a) starts the incrementing of *n*-bit cyclic counter 16; (b) conditions AND gate 26 to allow the bytes shifted out of stage ER–1 to be applied to stage ER–*n*; and (c) stops input device 18. Counter 16 increments one position for each shift of edit register 20 so that, when the edit register has completely cycled, and the counter generates an overflow signal on line 48 which is applied to state-control circuit 14 to transfer this circuit to the search-input state. While the edit register is being ring shifted, AND gate 30 is still conditioned by state control circuit 14 so that (*n*–1) bytes following the terminal-type punctuation are applied through lines 22 and 28 to be stored in addressable store 32.

In the search-input state, the key element is table storage 50. This element is a large-capacity storage device which is capable of being serially accessed. Table storage 50 would generally be a read-only memory such as, for example, a photographic disc. The storage device used for table storage 50 must also, as will be seen later, be capable of generating a timing pulse for each bit scanned. With a photographic disc storage device, each bit is represented by an impression on both sides of the median line, the order of these impressions being varied for a 0 and a 1, so that timing pulses may be derived from the information itself. With other types of information recording, timing pulses could be obtained by use of a timing track on the disc.

For the purpose of the following discussion, each entry stored in table storage 50 will be assumed to be of the following form $$\alpha_1\ \alpha_2\ A_1\ A_2\ A_3\ .\ .\ .\ \tau\ F_1\ F_2\ F_3\ .\ .\ .\ \alpha_1\ \alpha_2$$

where each of the above characters represents a byte (6 bits) and where $\alpha_1\ \alpha_2$ is a two byte (12 bit) character which represents the beginning of an entry in the table. The 12 bit code for this beginning-of-entry character is a unique code; in other words, when the bits of succeeding characters are being fed serially through a register, it is impossible for a combination of bits forming parts of two or more characters to be mistakenly identified as the beginning-of-entry character. The reason for this will be apparent later. This same symbol also serves as the end-of-entry symbol.

$A_1\ A_2\ A_3$ . . . are the argument bytes of a table entry which bytes are to be matched with the input bytes stored in the addressable store.

$\tau$ is the character used to represent the end-of-argument data and the beginning of function data.

$F_1\ F_2\ F_3$ . . . are the function bytes which are read out when a match is had on the corresponding argument bytes.

In addition to the normal characters in a table entry shown above, there are five special characters which may or may not appear in a given table entry. These characters will be mentioned only briefly at this point to call attention to their existence and will be discussed in more detail later.

They are:

$\phi$ which is a special character which may appear as one of the function bytes in a table entry having a terminal-type punctuation in its argument, and which indicates that the terminal-type punctuation in the argument is being used to end a sentence.

$\rho_1\ \rho_2$ . . . which are prefix bytes which may appear as the first few bytes of table entry argument or as the last few bytes of a table entry function.

$\mu$ which is a special character appearing in the function of a table entry which indicates that the bytes to follow are prefix bytes.

$\delta$ which is a special character appearing in the function of a table entry which indicates that the character following it, which character will be a numeral, is to be used to control the memory address selector in a manner which will be described in more detail later and, $\nu$ which is a special character which may appear anywhere in a table entry argument. This is a universal character which will match on any input byte it is compared with.

Table storage 50 is continuously scanned under control of scan control unit 52. This scanning occurs during all three stages of circuit operation. However, it is only during the search-input state that there is any control input to the scan control unit and that the output of the scan is utilized. During search-input-state scan control unit 52 controls the scan to cause a rough index scan to be made until the first entry just greater than that which is sought is found. When the scan starts with an entry higher than that being sought, the desired index point is found by scanning until the first entry less than that being sought is found and then jumping back to the next higher index point. The scan then initiates a detailed search to be started from this index point in a direction of lower valued entries until a match is found. With this sort of a scan, the longest possible argument entry which could match a given input word is scanned and matched on before any of the possible shorter entries which the input word could also match on. For example, if the input word is "beech," the argument "beechnut" is scanned before "beech" and "beech" is scanned before "bee" or "be." More will be said on this method of scanning later. A suitable scan control circuit is shown in FIG. 4 and described later.

The output from table storage 50 is applied bit by bit to a six-bit (byte) shift register 54. This shift register is continuously sampled by a plurality of detectors 56, 58, 60, 62, 64, 65 and 66 to determine if any of the special characters listed above are in the register. The bits shifted off the end of shift register 54 are applied through line 55 as one input to a compare circuit 67. A second input to compare circuit 67 is the output from $\nu$ detector 65 which, when it is present, inhibits the generation of a mismatch signal by this circuit.

To illustrate the manner in which the final input to compare circuit 67 is derived, it is necessary to refer back to edit register 20. When the ring shifting of this register is completed, stage ER–1 contains the second of the coded notations for the terminal-type punctuation while the remaining ($n$–1) stages contain information which may or may not be the beginning of a new sentence. However, even if a complete sentence has not been read into addressable store 32, there is no further need for the terminal-type punctuation code in stage ER–1 and this stage may therefore be used for other purposes during the search-input state. In this embodiment of the invention, stage ER–1 is therefore used to store successive bytes of input data from the addressable store while they are being compared in compare circuit 67 with the stored argument data from table storage 50 to detect a match.

When the device is in the search-input state, state control device 14 applies signals to memory address selector 40 to cause the information stored in addressable store 32 to be read out a byte at a time over line 69 to stage ER–1 and also applies a conditioning signal to serializer 36. When detector 56 detects a beginning-of-entry character in register 54 (this actually involves the detection of two successive characters in the register) match-mismatch flip-flop 68 is switched to its ON state causing a second conditioning signal to be applied to serializer 36. This allows the serializer to start applying the byte of input data stored in stage ER–1 to compare circuit 67 a bit at a time.

If, at the end of a byte, there is neither a mismatch signal from compare circuit 67 on line 71 nor the detection of an end-of-argument character ($\tau$) by detector 58, memory address selector 40 is energized, in a manner to be described later with reference to FIGS. 3A–3D to cause the next byte of information stored in addressable store 32 to be read into stage ER–1. This bit by bit comparison of successive input bytes with argument bytes of a table entry continues until either a mismatch is detected in compare circuit 67 or an end-of-argument character is detected by detector 58.

When a mismatch is detected, a signal is applied through line 71 to match-mismatch flip-flop 68 to turn this flip-flop off and is also applied to scan control circuit 52 to cause the scanning of a new table entry. The scan control circuit is able to detect (either from the polarity of the mismatch signal or from the line on which it appears) the direction in which the scan is to be adjusted and this adjustment may be made either on entry or an index adjustment, as desired. The mismatch signal is also applied by proper gating circuitry (shown in FIGS. 3A–3D), to the memory address selector to cause the first byte of information in the addressable store to be re-read into stage ER–1. When a new beginning-of-entry character is detected by detector 56, flip-flop 68 is again switched to its ON state, turning serializer 36 on to begin a new matching attempt with a new table entry.

When an end-of-argument character is detected by detector 58 prior to the occurrence of a mismatch signal, this indicates that there has been a match between the successive input bytes stored in addressable store 32 and the argument of the particular entry being scanned in table storage 50. The output from detector 58 is applied as one input to AND gate 70. The other input to this AND gate is the D.C. output level from the ON side of match-mismatch flip-flop 68. The match signal out of AND gate 70 is applied as one of the conditioning inputs to AND gate 72. The other conditioning input to this AND gate is the D.C. output level from the OFF side of prefix flip-flop 74. The significance of this signal will be apparent later. When AND gate 72 is fully conditioned, it passes the function bytes from table storage 50 corresponding to the matched-on argument bytes a byte at a time, under control of address selector 78, from byte register 54, through AND gate 72 to successive address positions in process storage 76.

The match signal out of AND gate 70 is also applied to memory address selector 40 to cause the byte in addressable store 32 following the last byte which was matched upon during the match operation just completed to be read into stage ER–1. When the next beginning-of-entry character is detected, in shift register 54, serializer 36 is re-energized to begin an attempt to match on a new set of input bytes.

The normal sequence of operations described above is somewhat altered when start-prefix character ($\mu$) is detected by detector 64 in the function portion of a table entry, the argument portion of which has been matched on. This causes a signal to be applied through line 73 to switch prefix flip-flop 74 to its ON state. The output level from the ON side of flip-flop 74 is applied through line 75 to memory address selector 40 to cause subsequent bits applied to addressable store 32 to be entered into its prefix region 38 and to AND gate 80 to cause the function prefix-bits now being applied to shift register 54 to be applied through AND gate 80 to the address in addressable store 32 indicated by address selector 40. AND gate 72 is deconditioned by the turning ON of flip-flop 74 thereby-preventing the function prefix-bytes from being read into process store 76. After the prefix-bytes have been read into prefix region 38, the signal applied by flip-flop 74 to memory address selector 40 then causes these prefix bytes to be applied, in succession, to stage ER–1 to be matched with similar prefix bytes appearing in the argument of table entries in table storage 50 during the next matching operation of the search-input state. When all of the prefix bytes read into prefix region 38 have been matched on without either a mismatch or an end-of-argument character being detected, the memory address selector then causes the input byte following the last input byte which was matched on to be read into stage ER–1, the same as for a normal matching operation. This ability to add prefix bytes to the normal input byte sequence allows a certain flexibility in the functioning of the device which will be apparent later.

The normal sequence of operations is also altered by the detection of a jump instruction (δ) by detector 66. This causes a signal to be applied to AND gate 81 to condition this gate to pass the next byte applied to register 54, which byte is always some numeral, to the memory address selector. This number is added to the contents of a register in the memory address selector, in a manner to be described later, to cause the next matching operation to start at a selected address in addressable store 32. If this address-modification feature was not available, the next matching operation would always have to start at the address following that in which the last byte matched on during the previous match operation is stored.

When a terminal-type punctuation is detected by detector 60 in shift register 54 (this would actually involve the detection of two successive bytes in register 54 since a terminal-type punctuation is represented by two characters) during the reading out of the argument portion of an entry from table storage 50, a signal is applied through line 81 to switch punctuation flip-flop 82 to its ON state. The switching of punctuation flip-flop 82 to its ON state causes a signal to be applied through line 83 to counter 16. This signal causes counter 16 to be stepped in synchronism with successive bytes being applied by table storage 50 to shift register 54. This stepping of the counter is stopped by the detection of an end-of-argument signal by detector 58. A mismatch signal out of compare circuit 67 resets punctuation flip-flop 82 to its OFF state and resets counter 16 to zero over a line not shown in FIG. 1. Counter 16, therefore, records the number of bytes following the terminal-type punctuation in a table entry argument which have been matched on.

The output from the ON side of flip-flop 82 is also applied through line 86 as one input to end-of-sentence recognizer circuit 84. The other inputs to this circuit are (a) the match signal on line 88 from AND gate 70; (b) the output line 90 from the end-of-sentence detector 62; and (c) the output line 92 from the beginning-of-entry (end-of-entry) detector 56. When there are signals on lines 86, 88 and 90, indicating a match on a terminal-type punctuation and the fact that this terminal-type punctuation is being used to end a sentence, the subsequently occurring end-of-entry signal on line 92, causes a signal on line 94, which signal is fed back to state control circuit 14 to switch the circuit to its not-in-use state and which signal also is applied to external control circuitry (not shown) to start the processing of the data stored in process store 76. When signals are applied to lines 86 and 88 indicating the matching on a terminal-type punctuation, but no signal is applied to line 90 indicating that the matched on terminal-type punctuation is not being used to terminate a sentence, the subsequently occurring end-of-entry signal on line 92 causes the end-of-sentence recognizer to generate a signal on line 13, which signal is applied through OR gate 10 and line 12 to state control circuit 14 to shift the device back into the load input state, to counter 16 to start the countdown of this counter, and to flip-flop 15 switching this flip-flop to its OFF state to decondition AND gate 30. The signal on line 13 is also passed through OR gate 10 and line 17 to start input device 18. Bytes applied by stage ER–1 to addressable store 32 are blocked by deconditioned AND gate 30, until counter 16 has counted down to zero, at which time flip-flop 15 is returned to its ON state conditioning AND gate 30 to pass subsequent bytes of information from stage ER–1 into addressable store 32. The bytes which are blocked by AND gate 30 in the above operation are the bytes which were already matched on during the preceding search-input state and the corresponding functions of which are already stored in process store 76.

*General operation*

The basic operation of the circuit shown in FIG. 1 is illustrated in a very general way by the flow diagram of FIG. 2. This diagram when read in conjunction with FIG. 1, is completely self-explanatory and will not be commented upon further.

To further illustrate the operation of the device shown in FIG. 1, the following specific example will be used. Assume that the sentence to be processed is—He visited the U.N.—and that the machine is to determine whether this is, in fact, a complete sentence. Assume further that a one-byte code is used to represent each letter of the alphabet and most of the special characters including the capitalize symbol, while a two-byte code is used for punctuation marks, the space symbol, and the beginning-of-entry (end-of-entry) character. Assume also that $n$ is equal to 16.

The circuit is initially in the not-in-use state. It is switched to the load-input state by a signal applied to start terminal 11. This signal may be a manually initiated signal which is applied at the beginning of the machine operation. For this situation, edit register 20 is empty and a signal must be applied, in a manner to be indicated later, to counter 16 to set this counter to ($n$–1). Ordinarily, however, the start signal applied to terminal 11 is derived from the machine itself when it has finished processing a sentence stored in process store 76 and is ready for a new one. For this situation, the edit register contains a few bytes which have already been processed in conjunction with the preceding sentence and the first few bytes of the new sentence. At this time counter 16 has, as will be seen later, a count stored in it which is equal to the number of bytes in edit register 20 which have already been processed.

Regardless of it origin, the start signal applied to terminal 11 is passed through OR gate 10 to line 12 to switch state control circuit 14 to the load-input-state, to switch flip-flop 15 to its OFF state, and to start the decrementing of counter 16. A signal is also applied to line 17 to start input device 18. Since it is not desired to store ZERO bytes, or bytes which have already been processed in addressable store 32, AND gate 30 is not conditioned to pass the output bytes from stage ER–1 into the addressable store until counter 16 has decremented to zero. At this time, flip-flop 15 is switched to its ON state conditioning AND gate 30 to store the subsequent output bytes from stage ER–1 in successive address positions of addressable store 32 under control of memory address selector 40.

For the example chosen, 21 bytes of the input sentence representing the part of the sentence—CAP he SPACE visited SPACE the SPACE CAP U—would be shifted through stage ER–1 before a terminal-type punctuation (a period in this case) is detected in stages ER–1 and ER–2 by detector 42. At this point it should be noted that if the start signal was derived from the machine as indicated above, the CAP symbol at the beginning of the sentence would already have been processed to determine the sentence end of the last sentence. In this situation, the cap symbol is not available to be matched on (the presence of this symbol is assumed by the processing circuitry) and only 20 bytes of the input sentence are shifted through ER–1 before the detection of the period.

After the detection of the period by detector 42 the first byte of the punctuation mark is shifted off and a signal is then generated on line 44 to turn off the input device, to condition AND gate 26, allowing the ring shifting of the contents of edit register 20, and to start counter 16. At this time, the edit register contains the last byte of the period, bytes representing—CAP N PERIOD (2) SPACE (2) SPACE (2) CAP—and the first seven bytes of a new sentence. When counter 16 has counted up to *n*, edit register 20 has been completely cycled causing the 15 bytes following the terminal-type punctuation to be stored in addressable store 32. The overflow signal on line 48 then switches state control circuit 14 to the search-input state.

The circuit shifting into the search-input state causes memory address selector 40 to shift the byte for the first CAP indication through line 69 into stage ER–1. When the next beginning-of-entry character ($\alpha_1$ $\alpha_2$) is detected by detector 56 flip-flop 68 is switched to its ON state starting serializer 36 to cause the bits of the bytes stored in stage ER–1 to be serially applied as one input to compare circuit 67. These bits are compared with the argument bits being applied through register 54 to the other input of compare circuit 67. Compare circuit 67 generates a mismatch signal, causing scan control circuit 52 to move to a new entry in the table, until an argument entry is found which matches the byte stored in stage ER–1. When a match is made on the byte stored in stage ER–1, a signal is applied to memory address selector 40 to cause the next byte stored in addressable store 32 to be applied to stage ER–1. The comparison which was started on the last byte is continued with this byte. If this comparison results in a mismatch prior to the detection of an end-of-argument character, a signal is applied to memory address selector 40 to cause the first byte matched upon to be restored to stage ER–1 and a signal is applied to scan control circuit 52 to change the table entry being scanned. When, after a match has been made on a byte, for example, the single byte of the capitalize symbol, and end-of-argument character is detected, a signal indicating a match is applied by AND gate 70 to AND gate 72, allowing the following function bits applied to register 54 to be applied a byte at a time to process store 76. The detection of a match also causes a signal to be applied to memory address selector 40 to cause the first byte of the succeeding word, in this case an "*h*" to be applied to stage ER–1.

The circuit now attempts to match on the remaining characters in addressable store 32. It should be remembered that the table search, as controlled by scan control circuit 52, starts by making big jumps until a table entry is found which is just greater than that which is being sought and then does a detailed search, starting from the points in the direction of smaller entries seeking to get the longest match which is possible. Therefore, when the circuit is attempting to match on, for example,—he SPACE visits—a rough scan is made until the entry such as "hyena" or "homocide" is found and then begins a detailed scan seeking to match on—he SPACE visits—. Assuming, that there is no entry—he SPACE visits—in the table, but that there is an entry "he" the scan proceeds through words like "heavy," and "heat" until it comes to the entry "he" followed by a $\tau$. Since there is a match on all the characters preceding $\tau$, flip-flop 68 is still in its ON state, applying a conditioning signal to AND gate 70 when the $\tau$ symbol is detected by detector 58. This causes an output from AND gate 70 which conditions AND gate 72 to pass the function bytes following the argument entry "he" into successive address positions of process store 76.

The circuit continues to operate in the manner indicated above storing, during subsequent search cycles, the function entries for the argument entries "visited" and "the" in process store 76.

This brings the first byte for the CAP symbol of the entry "U.N." into stage ER–1. Since "U.N." is a standard abbreviation which is used quite frequently, this entry would be stored as an argument in table storage 50. Since this is a standard abbreviation, the periods in it may not, and generally are not, used to terminate a sentence; therefore, an end-of-sentence symbol is not placed in the function portion of this entry. However, it is possible, as in the sentence which is being used for this example, for this abbreviation to end a sentence. Therefore, to determine if this abbreviation is being used to end a sentence, a further test is required. To provide for this further test, the entry for U.N. is of the following form:

$$\alpha_1\,\alpha_2\,\mathrm{CAP\ U\ P}n\ \nu\ \mathrm{CAP\ N\ P}n\ \tau\ \delta\ 2\ \text{(function symbols for U.N.)}\ \mu\ \rho_{AB}\ \alpha_1\ \alpha_2$$

where:

P*n* is the first byte of the two byte code for any word ending punctuation including a space punctuation; and $\rho_{AB}$ is a prefix byte which symbolizes an abbreviation.

Since the universal character ($\nu$) matches on any input byte, an output from detector 65 inhibiting a mismatch output from compare circuit 67, the argument of the above table entry will match on the input byte sequence—CAP UP*n* PERIOD CAP NP*n*—but, since the two byte code for a period does not appear in the argument of the table entry, punctuation flip-flop 82 remains in its OFF state. The abbreviation U.N. is therefore treated, during the first matching operation, as though it contained no punctuation marks.

After the detection of the end-of-argument character ($\tau$) by detector 58 detector 66 detects a jump instruction and generates an output signal which conditions AND gate 81 to pass the succeeding byte, representing the numeral 2, to memory address selector 40. This sets the memory address selector so that the next byte read from the non-prefix portion of the addressable store 32 into stage ER–1 will be the byte representing the P*n* character following the U, rather than the next byte following the last byte which was matched on, in this case the second byte of the period following the N, as is normally the case. The reason for this operation will become apparent later.

The function symbols for the entry U.N. are then passed through conditioned AND gate 72 to process store 76. It should be noted that all of the special characters except $\phi$ are inhibited in one way or another from being applied to process store 76. The manner of accomplishing this will be described later.

After the reading of these function characters into the process store, a start prefix character ($\mu$) is detected by detector 64 causing prefix flip-flop 74 to be switched to its ON state. The switching of prefix flip-flop 74 to its ON state deconditions AND gate 72, preventing subsequent bytes from being applied to process store 76, and conditions AND gate 80, allowing these bytes to be applied to prefix region 38. The switching of the prefix flip-flop also causes a signal to be applied to memory address selector 40, which signal causes the first prefix byte applied to AND gate 80 to be stored in the last address of prefix region 38. The prefix character $\rho_{AB}$ is therefore stored in the last address of the prefix region. The first end-of-entry character ($\alpha_1$) is also passed through AND gate 80 and is stored in the next-to-the-last address of this region.

The subsequently occurring output from detector 56 causes the loading of prefix region 38 to stop and causes what will be referred to as a prefix search to start. This operation is the same as any other matching operation, except that the memory address selector causes the prefix bytes stored in region 38 to be applied to stage ER–1 in the same order in which these bytes were stored until all of these prefix bytes have been matched on. After the bytes in the prefix region have all been matched on, the next byte applied to stage ER–1 is the input byte which would ordinarily have been applied in a normal matching operation.

For the illustrative example, the first character applied to stage ER–1 is $\rho_{AB}$. When $\rho_{AB}$ has been matched on, $\alpha_1$ is applied to stage ER–1. If there is a mismatch on this second character, scan control circuit 52 causes a new entry in table storage 50 to be scanned and memory address selector 40 causes the first prefix character $\rho_{AB}$, to be reinserted in stage ER–1.

When a match is made between a table entry argument and both of the characters in prefix region 38, the next character, in this example the P*n* byte following the U, is read from addressable store 32 into stage ER–1. Again, if there is a mismatch, scan control circuit 52 causes a new entry in table storage 50 to be scanned and memory address selector 40 causes the $\rho_{AB}$ byte to be re-inserted in stage ER–1.

The above procedure is repeated with successive bytes from addressable store 32 being read into stage ER–1, a new scan being started each time a mismatch signal is generated, until an end-of-argument character ($\tau$) is detected by detector 58 prior to the occurrence of a mismatch signal from compare circuit 67. Since, in the chosen example, the abbreviation U.N. is being used to end a sentence, and is followed by "SPACE SPACE CAP," the entry which is matched on during the prefix search has the following form:

$\alpha_1\ \alpha_2\ \rho_{AB}\ \alpha_1$ P*n* PERIOD $\nu\ \nu$ P*n* PERIOD P*n* SPACE P*n*

SPACE CAP $\tau$ (function for space, space cap) $\phi\ \alpha_1\ \alpha_2$.

It can be seen that, since two universal characters are used between the two periods in this table entry, this table entry could be used to match on any two-letter abbreviation followed by "SPACE SPACE CAP." There are similar table entries with bytes representing any other conceivable combination of characters which could be used, after an abbreviation, to end a sentence, being substituted for the characters representing "SPACE SPACE CAP." Entries also appear in the table having arguments with each of the possible forms of sentence-ending characters following an abbreviation preceded by a character sequence which matches on a three-bit abbreviation, a four-bit abbreviation, etc. As will be seen later, there is also an entry for each of the various length abbreviations which entry is matched on if none of the possible entries having sentence ending characters is matched on. A match on this entry is interpreted to mean that the abbreviation is not being used to terminate a sentence. It can be seen that the circuit is, in this way, able by use of one entry for each abbreviation and about fifty extra entries, to recognize the half dozen or so different forms in which many hundreds of abbreviations may appear.

When the first period in the above entry is detected by detector 60, punctuation flip-flop 82 is switched to its ON state. This causes counter 16 to start incrementing in synchronism with the application of bytes of argument characters to register 54. A mismatch signal out of compare circuit 67 causes counter 16 to be reset and an end-of-argument character detected by detector 58 causes a signal to be applied to counter 16 to stop the incrementing thereof. For the example chosen, the counter would have the number 9 stored therein when it is stopped by the signal from detector 58. The significance of this count will be described shortly.

Since an abbreviation followed by SPACE SPACE CAP is a character sequence which is generally used to end a sentence, an end-of-sentence character ($\phi$) is included in the function of the table entry shown above. This means that, when the end-of-entry characters ($\alpha_1\ \alpha_2$) are detected by detector 56, causing a signal to be applied to line 92, lines 86, 88 and 90 all have signals applied thereto. End-of-sentence recognizer circuit 84, recognizes input signals on all four of its input lines to mean that the end of a sentence has been found and generates an output signal on line 94. This signal is applied to state control circuit 14 to switch the device to its not-in-use state and is applied to external circuitry (not shown) to cause the processing of the information stored in process store 76 to commence.

When the language processing machine is finished with the information stored in process store 76, it applies a signal to terminal 11, causing an output signal from OR gate 10 on lines 12 and 17 to (a) switch the circuit back to the load-input state; (b) turn off flip-flop 15; (c) start the decrementing of counter 16; and (d) start input device 18. As was previously noted, counter 16 has a count of 9 stored in it at this time, and edit register 20 has bytes which have already been processed in stages ER–2 through ER–10 thereof, with the remaining 6 stages having the initial bytes of a new input sentence. Since flip-flop 15 is in its OFF state, AND gate 30 is deconditioned and the bytes shifted out of the edit register through stage ER–1 are not stored in addressable store 32. Counter 16 is stepped down in synchronism with the shifting of bytes out of edit register 20. When counter 16 has stepped down to 0, the 9 bytes already processed during the preceding cycle have been shifted off and the first byte of the new sentence is in stage ER–1. At this time, counter 16 applies a signal to switch flip-flop 15 to its ON state, conditioning AND gate 30 to apply this significant byte to the first position in addressable store 32. The loading of a new input sentence into addressable store 32 then proceeds in a manner previously described.

If the sentence in the above example had been—He visited the U.N. in New York.—the sequence of operations up to the prefix search would have been identical to that described above. Since, in this example, the abbreviation is followed by "SPACE in" the attempts to match on an entry argument of the form:

$\alpha_1\ \alpha_2\ \rho_{AB}\ \alpha_1$ P*n* PERIOD $\nu\ \nu$ P*n* PERIOD (A sentence ending sequence of characters) $\tau$, would fail and the longest match possible would be on the following entry:

$\alpha_1\ \alpha_2\ \rho_{AB}\ \alpha_1$ P*n* PERIOD $\nu\ \nu$ P*n* PERIOD $\tau\ \alpha_1\ \alpha_2$ A match on the above entry causes counter 16 to be incremented to a count of 4. Since the function of this character does not contain an end-of-sentence character ($\phi$), when end-of-entry detector 56 applies a signal to line 92, end-of-sentsence recognizer circuit 84 has inputs on only lines 86, 88 and 92. The end-of-sentence recognizer 84 interprets this combination of inputs to mean that the terminal-type punctuation detected is not being used to end a sentence and generates an output signal on line 13 to, among other things, switch the circuit back to the load-input state.

The signal on line 13, in addition to switching the circuit back to the load-input state, also switches flip-flop 15 to its OFF state starts the decrementing of counter 16 and starts input device 18. At this time, counter 16 has the number 4 stored therein and the edit register has bytes representing—CAP N P*n* PERIOD—stored in stages ER–2 through ER–5, which bytes have already been stored in the process store 76. The byte in stage ER–1 is shifted off before counter 16 starts decrementing. Counter 16 then decrements for each of the remaining bytes which are shifted off until, when the last of the above bytes is shifted off, the counter reaches a count of 0. The counter at this time generates an output signal which switches flip-flop 15 to its ON state conditioning AND gate 30 to apply the subsequent bytes to succeeding addresses in addressable store 32. Ordinarily, when counter 16 has been decremented to zero, the next byte applied to line 22 is stored in the first address position in addressable store 32. However, when the device is switched to the load-input state by a signal on line 13, a signal is applied to the memory address selector, as will be seen later, to cause this next byte to be stored in the address in addressable store 32 following that in which the last byte matched-on during the preceding search-input state is stored. Addressable store 32 therefore has a complete input sentence stored therein when a sentence-ending terminal-type punctuation is detected, which sentence may be used for any desired purpose.

After the circuit shifts back to the load-input state, input bytes are, in the above example, loaded into addressable store 32 until the two bytes representing the period at the end of the sentence are shifted into stages ER–1 and ER–2. These bytes are detected by detector 42 causing edit register 20 to go through a ring-shifting operation, such as that previously described, and the circuit to shift to the search-input state. During the search-input state, a match is first made on a table entry argument for the word "in." The function for this word is read into the address in process store 76 following that in which the function for the entry "U.N." is stored. A match is then made on a table entry containing the word "New York" in its argument and the function for this entry is likewise stored in process store 76.

The next entry matched on during the search-input state is of the following form:

$\alpha_1$ $\alpha_2$ P*n* PERIOD SPACE SPACE CAP $\tau$ (function entry for PERIOD SPACE SPACE CAP) $\phi$ $\alpha_1$ $\alpha_2$ When the two bytes of the period are detected by terminal-type punctuation detector 60, flip-flop 82 is switched to its ON state to start the incrementing of counter 16. The detection of the $\phi$ character by detector 62 causes this detector to generate a signal on line 90. Therefore, when end-of-entry detector 56 generates a signal on line 92, all of the inputs to end-of-sentence recognizer circuit 84 have signals thereon, causing recognizer 84 to generate an output signal on line 94. This signal causes the processing of the sentence stored in process store 76 to commence and switches the circuit to the not-in-use state. Counter 16 has, at this time, a count of three stored therein and the device is therefore ready, when a signal is applied to terminal 11 by the language processing machine (not shown), to start the loading of a new input sentence in a manner already described.

From the above, it can be seen that the device is not completely infallible. For example, the sentence "He visited the U.N. Monday and Grant's Tomb Tuesday." is a perfectly good sentence and therefore, the byte combination "Abbreviation SPACE CAP" cannot be one of the sentence-ending combinations stored in table storage 50. But, in some types of printing, such a byte combination may be used to end a sentence. However, it has been determined that, while a language processing machine cannot operate effectively on less than a complete sentence, it may operate successfully when two or more *complete* sentences are applied to it. The device of this invention therefore indicates an end-of-sentence only in unambiguous situations so that, in the rare situations where an error does occur, the error is that two or more complete sentences have been read into process store 76. A byte sequence representing less than a complete sentence will never be indicated to be a complete sentence by this device.

It should be noted also that the sentence boundary determination is made while the input data is being converted into proper form to be processed so that no additional operating time is required to perform this operation.

*Detailed circuit description*

FIGS. 3A–3D form a detailed block diagram of the circuit of this invention. For the elements having one to one correspondence in FIGS. 1 and 3A–3D, like numerals have been used to assist in correlating the two figures.

Referring now to FIG. 3A, input OR gate 10 has three inputs applied thereto. The left-most of these inputs is the return-to-load-input-state line 13; the next is the start-new-sentence line 100 from the language processing machine (not shown) and the last input is the start translation line 102 from the machine console. Line 102 also supplies a signal through line 104 to set the number (*n*–1) into counter 16. The output from OR gate 10 is applied to switch flip-flop 106 to its ON state and, through line 108(a) through OR gate 109 to counter 16 to start the decrementing thereof; (b) through OR gate 111 to one unit delay 110; (c) to flip-flop 15 to switch this flip-flop to its OFF state; (d) through OR gate 113 to the OFF-side input of flip-flop 114 to switch this flip-flop to its OFF state; and (e) to the ON side input of flip-flop 116 to switch this flip-flop to its ON state.

Flip-flops 114 and 116 determine the state the circuit is in. When flip-flop 114 is in its OFF state and flip-flop 116 is in its ON state, the device is in the load-input state. When both of these flip-flops are in their OFF state, the device is in the not-in-use state, while, when both of these flip-flops are in their ON states, the device is in the search-input state.

Flip-flop 106 is in its ON state during the portion of the load-input state when new information is being applied to edit register 20. The output from the ON side of this flip-flop is applied through line 118 to turn on input device 18, to condition AND gates 120, and to condition AND gates 122, 124, 126 and 128 of the terminal punctuation detector 42 (see FIG. 1).

The output from delay 110 is applied through OR gate 109 to decrement counter 16 and is also applied through AND gate 130 and OR gate 111 to the input to this delay. The other input to AND gate 130 is derived from the OFF-side output line of flip-flop 15. When counter 16 has been decremented to zero, the next signal applied to the counter causes an output signal on line 131 which rests flip-flop 15 to its ON state and is applied through AND gate 133 to set address index register (AIR) 154 to zero and through short delay 223, and OR gate 225 to condition AND gate 227 to pass the zero address now set in AIR through control gating circuit 135 to set the address zero into memory address register (MAR) 137. AIR is a register which is used to store the address at which the first input byte to be matched on during a given search is stored. MAR and the interconnection of these two registers will be described later. The signal on line 131 is also applied to the ON-side input of flip-flop 129 to switch this flip-flop to its ON state and as one input to AND gate 127. The other input to AND gate 127 is the OFF-side output from flip-flop 129 and to other input to AND gate 133 is the ON side output from the flip-flop. Flip-flop 129 is switched to its OFF state by a signal applied to its OFF side input by return-to-load-input-state line 13. The output from AND gate 127 is applied as one input to OR gate 225.

Information is applied by input device 18 to AND gates 120 a byte at a time. The outputs from AND gates 120 are applied in parallel through OR gates 132 to the ER–*n* stage of edit register 20. Bytes of information are shifted through the successive stages of the edit register as new information is applied to stage ER–*n* until the bytes reach stage ER–2. The output from this stage of the register is applied, a byte at a time, to AND gates 134. The conditioning signal for these AND gates is derived from the output of AND gate 136. This AND gate generates an output signal when flip-flop 114 is in its OFF state and flip-flop 116 is in its ON state, or in other words, when the circuit is in the load-input state.

The outputs from AND gates 134 are applied through OR gates 138 to the ER–1 stage of the edit register. The output from stage ER–1 is applied through lines 22 and 28 to AND gates 140. The conditioning signal for these AND gates is derived from AND gate 142. This AND gate derives its input signals from the output of AND gate 136 and the output from ON side of flip-flop 15. The outputs from AND gates 140 are applied to trigger corresponding drivers 143. Drivers 143 provide the information input to addressable store 32. The address information for this store is supplied by drivers 144 under control of memory address register (MAR) 137.

MAR is an $m$ bit register, the number $m$ being a function of the number of address positions in addressable store 32. The address stored in MAR is varied by signals applied to it from a variety of sources through control gating circuit 135. Control gating circuit 135 converts the pulses applied to it from various sources into pulses on the proper ones of the $m$ lines out of this circuit to set the desired address into MAR. A signal applied to gating circuit 135 is also passed through line 147 and short delay 145 to serve as one of the conditioning signals to AND gates 160. The address in MAR being varied by an input signal from gating circuit 135 causes drivers 144 corresponding to the new address in MAR to be energized. When a driver 144 is energized, it generates a signal which causes whatever is stored in the address corresponding to that driver to be read out and then generates a signal which caused the information then applied to the information input lines of the store to be read into that address. Nondestructive readout of addressable store 32 is achieved, in a well known manner, by feeding the output signals generated during the first cycle of drivers 144 back to information input lines during the second cycle.

When the circuit is in the load-input state, AND gate 136 is conditioned to pass a signal through line 149 and OR gate 151 to partially condition AND gate 153. A second conditioning input to this AND gate is derived from the ON-side output of flip-flop 15. The final conditioning input to this AND gate is derived from the OFF-side output of flip-flop 306 and may be assumed to be present unless otherwise indicated. When AND gate 153 is fully conditioned, as it is, for example, when information is being loaded into addressable store 32, it allows the output from MAR 137 to be incremented by one in one-bit adder 155 and applied back through AND gate 153 and gating circuit 135 into MAR. In this way, each succeeding byte of information is caused to be read into (or out of) the address following the address in which the last byte of information was read into (or out of).

The output from stage ER–2 is applied in parallel as the other input to AND gates 124, 126 and 128. The connections to these AND gates are such that AND gate 124 generates an output when the contents of stage ER–2 is the bit sequence representing the second byte of the PERIOD symbol. The connections to AND gates 126 and 128 are such that these AND gates generate an output when a bit combination representing the second byte of the question mark and/or the second byte of the exclamation mark code, respectively, are contained in stage ER–2. The outputs from these AND gates are passed through OR gate 146 to be applied as one input to AND gate 148. The other input to AND gate 148 is derived from AND gate 122 which generates an output, assuming it is conditioned, when the bit combination for the first byte ($Pn$) of any of the punctuation codes appears in stage ER–1. The output from AND gate 148 is applied to start pulse source 150. The first pulse out of pulse source 150 is applied to turn flip-flop 106 off. This pulse, and all subsequent pulses out of pulse source 150, is applied to step counter 16 one position and is also applied to condition AND gates 26. The other input to AND gates 26 is from stage ER–1, through lines 22 and 24. It should be noted that, at this time, AND gates 134 are still conditioned by the output from AND gate 136, but, flip-flop 106 being turned off, the input device is no longer functioning, and AND gates 120, 122, 124, 126 and 128 are deconditioned.

When counter 16 has counted up to $n$, the next pulse from source 150 causes an overflow signal on line 152. This signal is applied to pulse source 150 to turn this pulse source off and is applied to switch flip-flop 114 to its ON state. Since flip-flop 116 is already on its ON state, the switching of flip-flop 114 to its ON state by a signal on line 152 switches the circuit to the search-input state. The signal on line 152 is also applied to OR gate 225 for reasons which will be apparent later.

The second conditioning signal for AND gates 160 (FIG. 3A) is derived from the ON-side output of flip-flop 114 (FIG. 3B). The ON-side output from this flip-flop is also applied as one input to AND gate 164. The other conditioning input to this AND gate is derived from the ON-side output of match-mismatch flip-flop 68 (FIG. 3D). It will be remembered from the description of FIG. 1, that flip-flop 68 is in its ON state only when a search of a table entry has been started and no mismatch detected. The final input to AND gate 164 is the timing-pulse output line 165 from table storage 50 (FIG. 3C). The output from AND gate 164 is applied to step 6-bit ring-counter 168 and to partially condition AND gates 176 and 180. Counter 168 therefore generates timing pulses in synchronism with the scanning of bits in table storage 50 during the portion of the search-input-state when flip-flop 68 is in its ON state. The first of these timing pulses is applied to line **170*a* with succeeding pulses being applied to succeeding lines. The sixth timing pulse is applied to line 170*f* to complete a cycle and the seventh timing pulse is applied to line 170*a* again. Counter 168 continues to generate timing pulses in this manner until flip-flop 68** is reset to its OFF state by the detection of some sort of a mismatch.

The lines 170 form one set of inputs to AND gates 172. The other input to these AND gates is derived from the triggers of stage ER–1 through lines 22 and 34. At any given bit time there is an output from only one of the AND gates 172. This output is passed through OR gate 174 to be applied as one input to AND gate 176. The output from OR gate 174 is also applied through logical inverter 178 as one input to AND gate 180.

Table storage 50 and scan control circuit 52 (FIG. 3C) have already been described with reference to FIG. 1 (scan control circuit 52 will be described in more detail later with reference to FIG. 4) and will not be described again here. The output from table storage 50 is applied, a bit at a time, to 6-bit shift register 54. As bits are shifted off the end of this register, they are applied through line 182 as one input to AND gate 180 and through logical inverter 184 as a second input to AND gate 176. The third input to AND gates 176 and 180 is, as was mentioned previously, the output from AND gate 164, and the fourth input to these AND gates is the output from the OFF-side of universal character flip-flop 186. AND gates 176 and 180 and logical inverters 178 and 184 combine to form the compare circuit 67 shown in FIG. 1. When flip-flop 186 is turned ON by the detection of a universal character ($\nu$) by AND gate 65, neither AND gate 176 nor AND gate 180 can be fully conditioned and the generation of a mismatch signal is thus inhibited. The output from detector AND gate 65 is also applied through inverter 187 to condition AND gate 189. If the next byte applied to register 54 is not also a universal character, the next signal applied to line 166 after flip-flop 186 is turned on, is passed through AND gate 189 to switch flip-flop 186 to its OFF state. As will be seen later, this condition occurs one byte time after the flip-flop is turned on.

The byte stored in register 54 (FIG. 3C) is continuously applied through line 188 to a series of detector AND gates. AND gate 190 generates an output signal when bits representing the special character $\alpha_1$ are stored in register 54. AND gate 192 generates an output signal when bits representing the special character $\alpha_2$ are stored in this register. The output from AND gate 190 is applied through one byte delay 194 as one input to AND gate 56. The other input to this AND gate is the output from AND gate 192. An output from AND gate 56 indicates that a beginning of entry character (end-of-entry character) ($\alpha_1\ \alpha_2$) has been detected. The output from AND gate 56 is applied through one byte delay 195 to switch match-mismatch flip-flop 68 to its ON state.

As was mentioned previously, the twelve-bit combination $\alpha_1$ $\alpha_2$ is a unique one, which cannot be spuriously formed by any combination of bits forming parts of two or more bytes passing through shift register 54. Therefore, in addition to telling the device that the beginning of an entry has been found in table storage 50, the detection of this character is also used to detect the beginning of a byte. This is accomplished by applying the output from AND gate 56 through line 196 to reset 6-bit (1 byte) counter 198 to zero. Counter 198 is stepped by timing pulses applied by table storage 50 to line 165 each time a bit is scanned. The effect of the signal on line 196 is therefore to synchronize this count with the scan. An output pulse is applied by the counter to AND gate 202 for every six timing pulses applied to the counter. The other input to AND gate 202 is the output from OR gate 203. One input to OR gate 203 is the ON side output from match-mismatch flip-flop 68. The other input to this OR gate is the ON-side output from flip-flop 230. This means that once an $\alpha_1$ $\alpha_2$ bit sequence has been detected, a signal will appear on the output line 166 of AND gate 202 as each complete byte is stored in register 54 until a mismatch signal is applied to switch flip-flop 68 to its OFF state or until, where there is a match, the reading of the function into process store 76 has been completed.

The signal on line 166 is applied as one input to $\tau$ detector AND gate 58, $\phi$ detector AND gate 62, $\mu$ detector AND gate 64, $\delta$ detector AND gate 66, $\nu$ detector AND gate 65, $P_n$ detector AND gate 204, PERIOD detector AND gate 206, QUESTION MARK detector AND gate 208, and EXCLAMATION POINT detector AND gate 210. The other input to each of these AND gates is the output line 188 from shift register 54. Therefore, each of these AND gates, generates an output signal when a complete byte representing their respective character is stored in shift register 54.

Since the scanning of a byte, either in table storage 50 or in stage ER–1, always is from higher-order bits to lower-order bits, an output signal from AND gate 176 on line 214 means that there has been a mismatch and that the input byte is greater than the table entry byte. An output from AND gate 180 on line 216 indicates that a mismatch has occurred and that the input byte is less than the table entry byte. The signals on lines 214 and 216 are applied directly to scan control circuit 52 to cause a suitable adjustment in the table entry which is to be scanned in a manner to be described in detail later. A signal on line 214 or 216 is also applied through OR gate 218 to the OFF-side input of match-mismatch flip-flop 68. The output from OR gate 218 is also applied as one input to AND gate 220, as one input to AND gate 222 and as one input to AND gate 224. The switching of flip-flop 68 to its OFF state deconditions AND gate 164 to stop the flow of timing pulses from counter 168. The other input to AND gates 220, 222 and 224 is derived from the output of $\tau$ detector AND gate 58 through inverter 226. In addition to the two inputs mentioned above, AND gate 222 is also connected to the ON-side output from punctuation flip-flop 82. The reason that the mismatch signal out of OR gate 218 is coupled with a not–$\tau$ signal from inverter 226 in AND gates 220, 222 and 224 is that what will be referred to as a $\tau$–mismatch is used to reset flip-flop 68 after a match has been detected (an operation which will be described in a later section) but an output is desired from AND gates 220, 222 and 224 only when a true mismatch has occurred.

The output from AND gate 224 is applied through OR gate 225 to condition AND gate 227. When AND gate 227 is conditioned, it allows the contents of AIR 154 to be passed through gating circuit 135 to MAR 137.

The output from the ON-side of match-mismatch flip-flop 68 (FIG. 3D) is applied as one of the inputs to AND gate 70. The other input to this AND gate is the output from $\tau$ detector AND gate 58. The output from AND gate 70 is applied to switch flip-flop 230 to its ON state and is also applied through line 232 as a third input to scan control circuit 52 and through line 232 and one-byte delay 234 as one input to AND gate 236. The other input to AND gate 236 is from the output of $\delta$ detector AND gate 66 through line 312 and inverter 238. The output from AND gate 236 as applied as the conditioning input to AND gate 239. When AND gate 239 is conditioned, it passes the address stored in MAR through OR gate 241 to AIR 154.

The output from the OFF-side of flip-flop 230 is applied as one of the conditioning inputs to AND gate 231. The other conditioning input to this AND gate is derived from the ON-side output of match-mismatch flip-flop 68. When AND gate 231 is fully conditioned, each signal on line 166 is passed through this AND gate and OR gate 151 to fully condition AND gate 153. As was previously indicated, this allows the address in MAR to be increased by one, causing the contents of the new address to be read out from addressable store 32. Therefore, when a match is being attempted on a table-entry argument, a new byte is read out of addressable store 32 at the end of each byte until either a match or a mismatch is detected.

The output from the ON-side of flip-flop 230 is applied to condition AND gate 240 and is also applied through line 242 as one of the inputs to AND gates 244, 246 and 296. The other input to AND gate 240 is derived from line 166. The output from AND gate 240 is applied to condition AND gate 248 to pass a byte of data stored in register 54 through lines 188 to trigger drivers 250.

The drive signals from drivers 250 are applied to AND gates 252 and 254. A conditioning input to AND gates 252 is derived from the OFF-side output of flip-flop 266. Flip-flop 266 is turned on by an output signal from detector AND gate 66 or 190 through OR gate 264. The output from OR gate 264 is also applied through two byte delay 265 to the OFF-side input of flip-flop 266. Flip-flop 266 is therefore turned off to condition AND gates 252 two byte times after it is turned on. The other conditioning input to AND gates 252 is derived from the OFF-side output of flip-flop 256. The outputs from AND gates 252 are used to apply the information storing drive signals to process store 76. The other input signal to AND gate 254 is derived from AND gate 246 through line 258 and one byte delay 259. As was mentioned previously, one of the inputs to AND gate 246 is derived from line 242; the other input to this AND gate is derived from the ON-side output of flip-flop 256. The outputs from AND gates 254 are applied through lines 260 to apply input signals to addressable store 32. The input signals on line 260 are, as will be seen later, stored in the prefix region 38 of addressable store 32.

The output from AND gate 240 (FIG. 3D) is also applied as one input to AND gate 262. A second input to AND gate 262 is derived from the OFF-side output of flip-flop 256. A third input to AND gates 262 is derived from the OFF-side output from flip-flop 266. The final input to this AND gate is derived from address register 268 through one-bit adder 270. The output from AND gate 262 is applied through gating circuit 272 to control address register 268. Gating circuit 272 performs a function similar to that performed by gating circuit 135 (FIG. 3B). Address register 268 is reset by a signal applied to it through OR gate 274 and gating circuit 272. A signal is applied to OR gate 274 either from the console when the language processing machine is started or by the language processing machine when it has completed the processing of the sentence stored in process store 76 and is ready for a new input sentence. Address register 268 contains the address at which the next byte of information is to be stored in process store 76 and energizes suitable drivers 276 to cause the storage of information in this address.

Referring back to the punctuation recognizers, 204, 206, 208 and 210 (FIG. 3C), the output from $P_n$ recognizer 204 is applied through a one-byte delay 277 as one input to AND gate 278. The outputs from the PERIOD, QUESTION MARK, and EXCLAMATION POINT detector AND gates 206, 208 and 210, respectively, are passed through OR gate 280 to form the other input to AND gate 278. AND gate 278 therefore generates an output to switch punctuation flip-flop 82 to its ON state when a $P_n$ byte is applied to register 54 followed by the second byte of the code for either a period, question mark, or exclamation point. The output level from the ON side of flip-flop 82 is applied as one of the inputs to AND gates 222, 244 and 282. AND gate 282 is also connected to line 166 and derives input therefrom. A third input to this AND gate is the output level from the ON side of match-mismatch flip-flop 68 and the final input to this AND gate is the output level from the OFF-side of flip-flop 230. AND gate 282 therefore generates an output for each byte of information passing through shift register 54, after the detection of a terminal-type punctuation passing through this register, until either a mismatch signal occurs or until an end-of-argument character ($\tau$) is detected. The output from AND gate 282 is applied through line 284 to increment counter 16 one position. When a true mismatch signal occurs, AND gate 222 is fully conditioned to apply a reset signal to this counter and AND gate 220 is fully conditioned to apply a signal through OR gate 285 to reset flip-flop 82 to its OFF state. The other input to OR gate 285 is the output from AND gate 56.

AND gate 244 (FIG. 3D) is fully conditioned when punctuation flip-flop 82 is in its ON state and flip-flop 230 is in its ON state. The output from this AND gate is applied as one input to AND gate 286, and as one input to AND gate 288. The other input to AND gate 286 is derived from the $\phi$ detector AND gate 62. The output from AND gate 286 is applied to switch flip-flop 290 to its ON state. The output from the ON side of flip-flop 290 is applied as one of the inputs to AND gate 292. The output from the OFF-side of flip-flop 290 is applied as the second conditioning input to AND gate 288. The final input to AND gates 288 and 292 is derived from the output of $\alpha_1$ $\alpha_2$ detector AND gate 56 through line 212. This signal is also applied to the OFF-side input of flip-flop 290 to switch this flip-flop to its OFF state.

From the above, it can be seen that AND gate 288 generates an output when there is a match on a table entry argument having a terminal-type punctuation therein, but there is no end-of-sentence character ($\phi$) in the function of this entry, while AND gate 292 generates an output when an entry having a terminal-type punctuation in the argument thereof is matched on and the function of this entry does contain the character $\phi$. AND gates 244, 286, 288 and 292 and flip-flop 290 combine to make up the end-of-sentence recognizer circuit 84, shown in FIG. 1.

The output line 13 from AND gate 288 is connected as one of the inputs to OR gate 10 and as the input to the OFF side of flip-flop 129. The output line 94 from AND gate 292 is connected through line 294 to the OFF side input of flip-flop 116 and through line 294 and OR gate 113 to the OFF-side input of flip-flop 114. A signal on line 294 therefore switches the device to the not-in-use state. Line 94 is also connected to external circuitry (not shown) to start the processing of the information stored in process store 76.

The output from $\mu$ detector AND gate 64 is connected as one input to AND gate 296. The other input to this AND gate is derived through line 242 from the ON side output of flip-flop 230. The output from AND gate 296 is applied to switch flip-flop 256 to its ON state and to OR gate 297. The output from the ON side of flip-flop 256 is connected, as previously mentioned, as one input to AND gate 246 and is also connected as one input to AND gate 298. The other input to AND gate 298 is derived through line 212 from the output of $\alpha_1$ $\alpha_2$ detector AND gate 56. The output from AND gate 298 is connected as the other input to OR gate 297. The output from OR gate 297 is applied through line 300 to switch flip-flop 306 to its ON state and to gating circuit 135 to cause the setting of MAR 137 to an all 1's condition (to cause the address of the last address in prefix region 38 to be recorded in MAR).

The output from AND gate 246 in addition to being applied through line 258 and one byte delay 259 as one of the conditioning signals to AND gate 254 as previously mentioned, is also applied through line 258 and delay 259 as the conditioning input to AND gate 303. The other input to AND gate 303 is derived from line 166. The output from AND gate 303 is applied through OR gate 304 to condition AND gate 305. When AND gate 305 is conditioned, the contents of MAR are decremented by one in one-bit subtractor 307 and applied back through AND gate 305 and gating circuit 135 to MAR. When this is done, it causes information to be either read into or out of addressable store 32 at the new address indicated by MAR. The output from the ON side of flip-flop 306 (FIG. 3C) is applied as the one input to AND gate 309. The other input to this AND gate is derived from the output of AND gate 231. The output from AND gate 309 is applied as the other input to OR gate 304. Flip-flop 306 is switched to its OFF state by an output signal from $\alpha_1$ detector AND gate 190. The output from the OFF-side of flip-flop 306 is applied, as was mentioned previously, as one of the conditioning inputs to AND gate 153.

The ON-side output from flip-flop 306 is also applied to condition AND gate 302. When AND gate 302 is conditioned, an output from $\alpha_1$ detector AND gate 190 is passed through AND gate 302 and OR gate 225 to condition AND gate 227, allowing the contents of AIR to be applied through gating circuit 135 to MAR.

The final input to OR gate 225 is derived, through line 312, from the output of $\delta$ detector AND gate 66. The output from $\delta$ detector AND gate 66 is also applied through line 312 and one byte delay 313 as one input to AND gates 314 and as one input to AND gate 316. The signal on line 312 is also passed through inverter 238 to form one input to AND gate 236 as previously mentioned. The other input to AND gates 314 are the parallel outputs from stages or register 54. When AND gates 314 are conditioned, the contents of register 54 are applied as one input to adder 318. The other input to this adder is the output from MAR 137. The output from adder 318 is applied through conditioned AND gates 316 as one of the inputs to OR gate 241 and is also applied through gating circuit 135 to MAR. The output from OR gate 241 is applied as the input to AIR 154. The address stored in AIR is, in this way, modified.

*Scan control circuit*

FIG. 4 shows a scan control circuit suitable for use with the circuits shown in FIGS. 1 and 3C. Referring to FIG. 4, an input signal on line 214, indicating that the table entry is less than the input entry, is applied to the ON side input of flip-flop 330, as one input to AND gate 332 and as one input to AND gate 334. The other input to AND gate 332 is to ON side output from flip-flop 330. The output from AND gate 332 is applied to cause the scan to jump to the next higher index point.

An input signal on line 216, indicating that the table entry being scanned is greater than the input entry, is applied as one input to AND gates 336, 338 and 340. The other input to AND gate 336 is derived from the ON side output of flip-flop 330. The other input to AND gate 338 is derived from the OFF side output of flip-flop 338. The other input to AND gate 340 is derived from the ON side output of flip-flop 342.

The output from AND gate 336 is applied to the ON side input of flip-flop 344 and to the OFF side input of flip-flop 330. The input to the OFF-side input of flip-flop 344 is match-line 232 from AND gate 70 (FIGS. 1 and 3D). The output from the OFF-side of flip-flop 344 is applied as a second input to AND gate 338. The output from the ON side output of flip-flop 344 is applied as one input to AND gate 346. The other input to AND gate 346 is line 348 which line has a signal thereon when, assuming table storage 50 is a disc, the end of a track on the disc has been reached. The output from AND gate 346 is applied as one input to OR gate 350.

The output from AND gate 338 is applied to the ON side input of flip-flop 342. The output from the ON-side of flip-flop 342 is applied as the other input to AND gates 334 and 340. The output from AND gate 334 is applied to the OFF-side input of flip-flop 342. The output from AND gate 340 is applied as the other input to OR gate 350. The output from OR gate 350 is applied to cause the scan to jump to the next lower index point.

To illustrate the operation of the circuit shown in FIG. 4, assume that the flip-flops are all initially in their OFF state and that a signal is applied to line 214 indicating that the table entry is less than desired. The first signal on line 214 switches flip-flop 330 to its ON state, conditioning AND gate 332. The next scan is of the next lower table entry which is, of course, still too low, causing a signal on line 214 which is now passed through conditioned AND gate 332 to cause the scan to jump to the next lower index point. The above process is repeated until the first index point which is too high is scanned causing a signal on line 216. This signal finds only AND gate 336 conditioned, causing an output signal which resets flip-flop 330 to its OFF state and switches flip-flop 344 to its ON state. The next scan is of the next lower table entry. It is assumed, for this discussion, that there will be a matching entry for each possible input byte combination. Therefore, the result of the next scan will either be a match signal on line 232 or a higher-than signal on line 216. If there is a match signal, flip-flop 344 is reset and the circuit is ready for a new scan. If there is a signal on line 216, this signal finds all AND gates deconditioned and is ineffective. The scan therefore proceeds to succeeding lower order entries as if no signal on line 216 had occurred. If, assuming table storage 50 is a disc having a plurality of tracks thereon, the end of a track is reached during the detailed scan before a matching entry is found, a signal is applied to line 348 which signal is passed through conditioned AND gate 346 and OR gate 350 to cause the detailed scan to be continued on the next lower track.

If the scan initially starts on too high a table entry, the first input signal is applied to line 216. This signal passes through conditioned AND gate 338 to switch flip-flop 342 to its ON state. Assuming that the next lower table entry is still too high, a second signal appears on line 216 which signal is passed through now-conditioned AND gate 340 and OR gate 350 to cause the scan to jump to the next lower index point. Succeeding input signals on lines 216 cause succeeding jumps to lower index points until an entry less than that sought is found. This causes a signal on line 214 which is applied to switch flip-flop 330 to its ON state and through conditioned AND gate 334 to switch flip-flop 342 to its OFF state. The following operations are identical to those which occurred when the first input signal was on line 214.

*Detailed description of operation*

Figure 1:
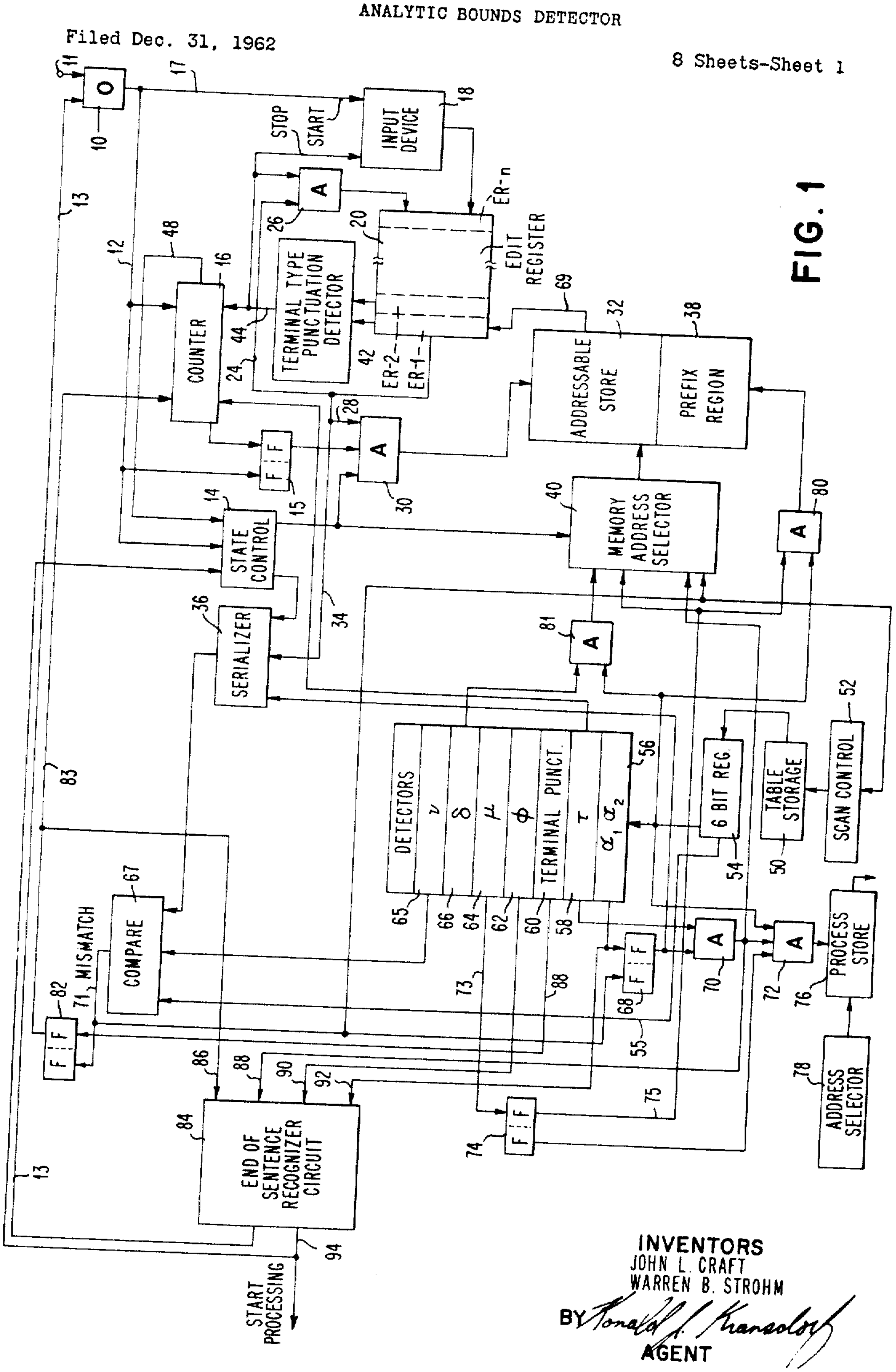
Figures 2, 2A:
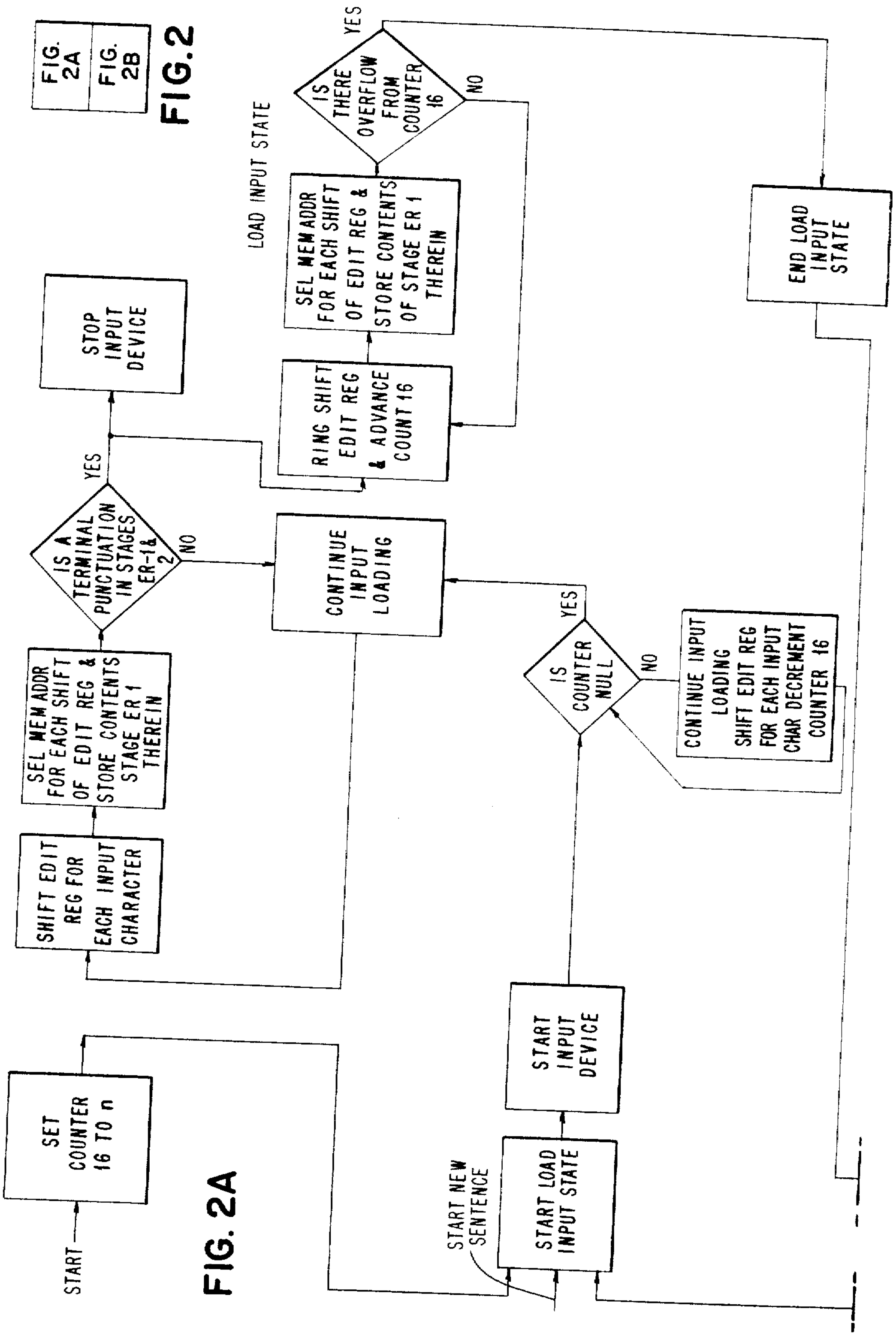
Figure 2B:
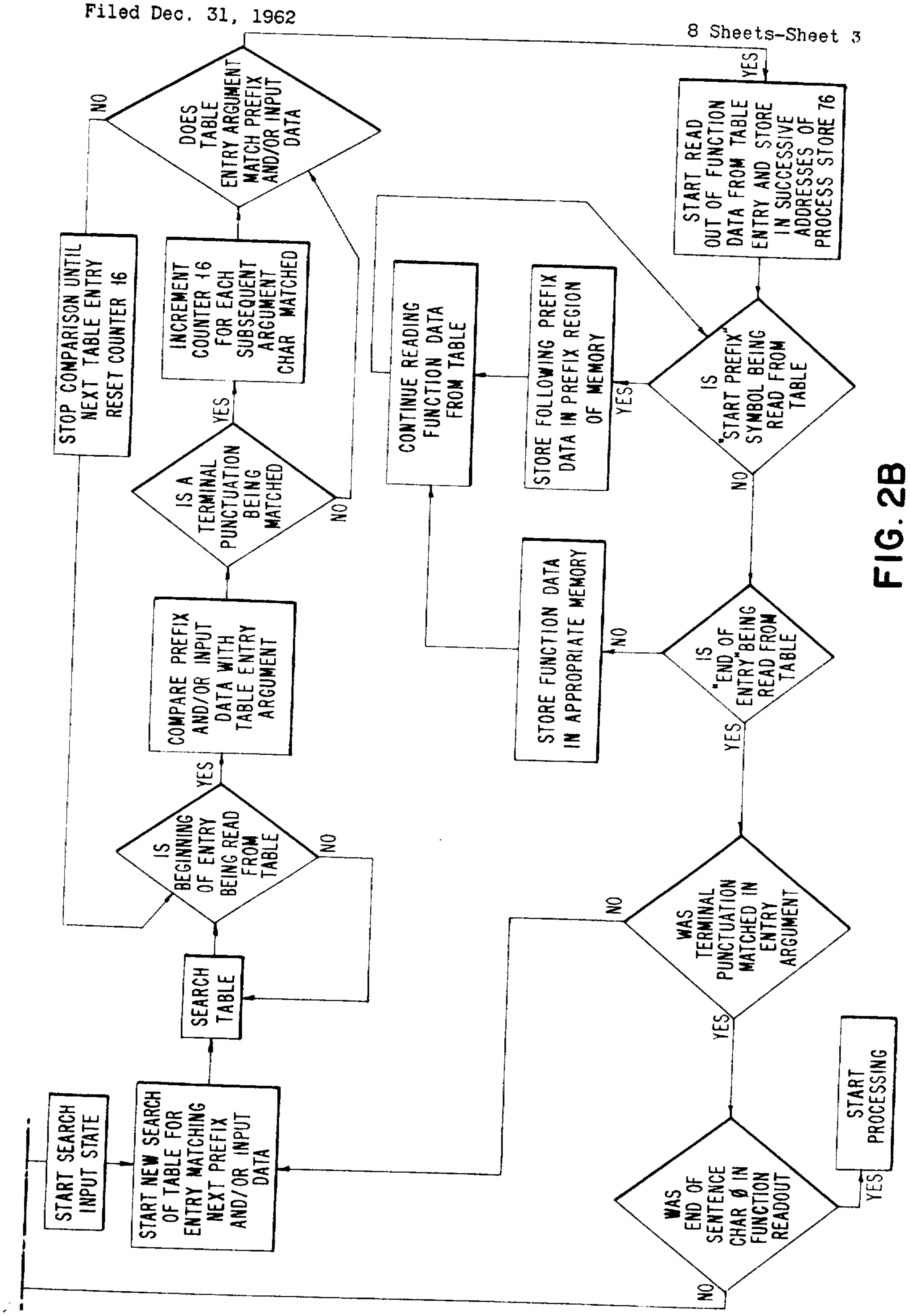

In describing the operation of the circuit shown in FIGS. 3A–3D, the same examples will be used and the same assumptions made as for the description of the circuit shown in FIG. 1. The first sentence to be processed is—He visited the U.N.—. For purposes of this example, it is assumed that the device is initially in its not-in-use state and is to be started by a start-processing signal from the console being applied to line 102. It is further assumed that initially counter 16 has a count of 0 stored therein, and that there are no information bytes stored in edit register 20.

The input signal applied to line 102 (FIG. 3A) is passed through line 104 to set a count of ($n$–1) into counter 16. For the example chosen ($n$–1) would be fifteen. The signal on line 102 is also passed through OR gate 10 to switch flip-flop 106 to its ON state and to generate a signal on line 108. The signal on line 102 is also applied through OR gate 274 (FIG. 3D) and gating circuit 272 to set address register 268 to address 0.

The signal on line 108 is applied (a) to $n$-bit counter 16 to cause this counter to decrement one position; (b) to one unit delay 110; (c) to flip-flop 15 to switch this flip-flop to its OFF state; (d) to the OFF-side input of flip-flop 114 to switch this flip-flop to its OFF state; and (e) to the ON-side input of flip-flop 116 to switch this flip-flop to its ON state. The output from the ON side of flip-flop 106 is applied through line 118 to turn on input device 18 and is also applied through line 118 to condition input AND gates 120 and to condition terminal-punctuation-detector AND gates 122, 124, 126 and 128. The circuit is now in the load-input state and is ready to receive the input information from input device 18.

A byte sequence representing the sentence—He visited the U.N.—is now applied through conditioned AND gate 120 and OR gate 132 to the ER–$n$ stage of edit register 20 and each succeeding byte is shifted through the succeeding stages of this register to the ER–2 stage. From the ER–2 stage, the bytes are shifted through conditioned AND gates 134 and OR gates 138 to the ER–1 stage. As the bytes of the sentence are being shifted through edit register 20, the 0 bytes which were originally stored therein are being shifted off stage ER–1 onto line 22. These bytes are applied through line 28 to AND gates 140, but, since flip-flop 15 is in its OFF state, AND gates 142 and 153 are not conditioned so that no conditioning signal is applied to AND gates 140 and the address in MAR is not advanced. For each shift of edit register 20, delay 110 applies a signal to decrement counter 16 one position, and, applies a signal through OR gate 109, conditioned AND gate 130 and OR gate 111 to its input. After $n$ shifts have taken place, all of the 0 bytes initially stored in edit register 20 have been shifted off and the byte in stage ER–1 is the byte representing the CAP for the letter H. Counter $n$ has, at this time, been decremented to zero. The next pulse from delay 110 causes an output signal from counter 16 on line 131 which signal is applied on the ON-side input of flip-flop 15 to switch this flip-flop to its ON state and is applied through conditioned AND gate 133 to set AIR to zero. The output from AND gate 133 is delayed sufficiently in delay 223 to allow AIR to be set to zero and is then applied through OR gate 225 to condition AND gate 227 to pass the zero address in AIR through gating circuit 135 to MAR. MAR is in this way set to zero causing a signal to be applied to condition the first address in addressable store 32 to receive an input byte.

Flip-flop 15 being in its ON state causes AND gates 142 and 153 to be fully conditioned. AND gate 142, being conditioned, causes AND gates 140 to be conditioned to pass the bytes now shifted out of stage ER–1 to trigger appropriate drivers 143. AND gate 153 being fully conditioned allows the output from MAR to be passed through one-bit adder 155, AND gate 153 and gating circuit 135 back into MAR. The address in MAR is in this way stepped one position after each byte of information is read into addressable store 32. The succeeding bytes of the sentence are applied by input device 18 through conditioned AND gate 120, OR gate 132 the successive stages of edit register 20, lines 22 and 28 and AND gates 140 into addressable store 32 in address position selected by MAR until the two bytes representing the period following the letter U in the abbreviation U.N.

are shifted into stages ER–1 and stages ER–2 of edit register 20.

The P*n* byte in stage ER–1 is detected by AND gate 122 causing one input signal to be applied to AND gate 148. The period byte in stage ER–2 is detected by AND gate 124. The resulting output from AND gate 124 is applied through OR gate 146 as the other input to AND gate 148. The output signal from AND gate 148 is applied to turn on pulse source 150. Each pulse from pulse source 150 causes counter 16 to be incremented one position and applies a conditioning signal to AND gates 26 to allow the byte shifted out of stage ER–1 to be ring-shifted through lines 22 and 24, AND gates 26 and OR gates 132 to stage ER–*n*. In addition to performing these functions, the first pulse out of pulse source 150 also switches flip-flop 106 to its OFF state. The switching of flip-flop 106 to its OFF state turns off input device 18, deconditions AND gate 120, and deconditions the terminal-punctuation-detector AND gates 122–128. It should be noted that prior to the generation of the first pulse by pulse source 150, a final shift of the edit register is performed so that when the ring shift begins (and when it ends) stage ER–1 contains the second byte of the period code and the fifteen bytes following this byte in the input sequence are contained in stages ER–2 through ER–*n*.

When pulse source 150 has applied *n* (sixteen for this example) pulses to counter 16 and AND gates 26, edit register 20 has been completely cycled so that the second byte of the period following the letter U is again in stage ER–1 and the *n*–1 bytes following this byte are in the remaining stages of edit register 20. The next pulse applied to counter 16 causes the counter to generate an overflow signal on line 152 which is applied to turn off pulse source 150 and is also applied to switch flip-flop 114 to its ON state, switching the device to the search-input state. This overflow signal is also applied to OR gate 225 to condition AND gate 227 to pass the contents of AIR into MAR. Since AIR has previously been reset to zero, this operation effectively sets the address zero into MAR. The output from the ON side of flip-flop 114 is applied to partially condition AND gates 160 and 164. The signal passed through gating circuit 135 causes a signal to be applied through line 147 and delay 145 to fully condition AND gates 160. The resetting of MAR causes an output signal therefrom which triggers the drivers 144 for the address 0 to cause the contents of this address in addressable store 32 to be read out through conditioned AND gates 160 and OR gates 138, to stage ER–1. It is noted that the same drivers are used for writing information into and reading information out from addressable store 32. This presents no problem since drivers for magnetic core matrices which are capable of applying a pulse of first one polarity and then the opposite polarity to a drive line are well known in the art. It is also assumed as was mentioned previously that addressable store 32 is of a type which gives a non-destructive readout so that information is lost only when a new information is read into a particular address. Magnetic core matrix memory arrays capable of giving non-destructive readout are likewise well known in the art.

As was mentioned previously, table storage 50 is being continuously scanned under control of scan control circuit 52. However, scan control circuit 52 can control a scan only when input signals are applied to it on lines 214 and 216, and signals can be applied to these lines only when there is an output from AND gate 164. Since AND gate 164 generates an output only during short portions of the search-input state, it is only during this period that there is a controlled scan of table storage 50 and that any useful output is derived therefrom.

Figures 3, 3A:
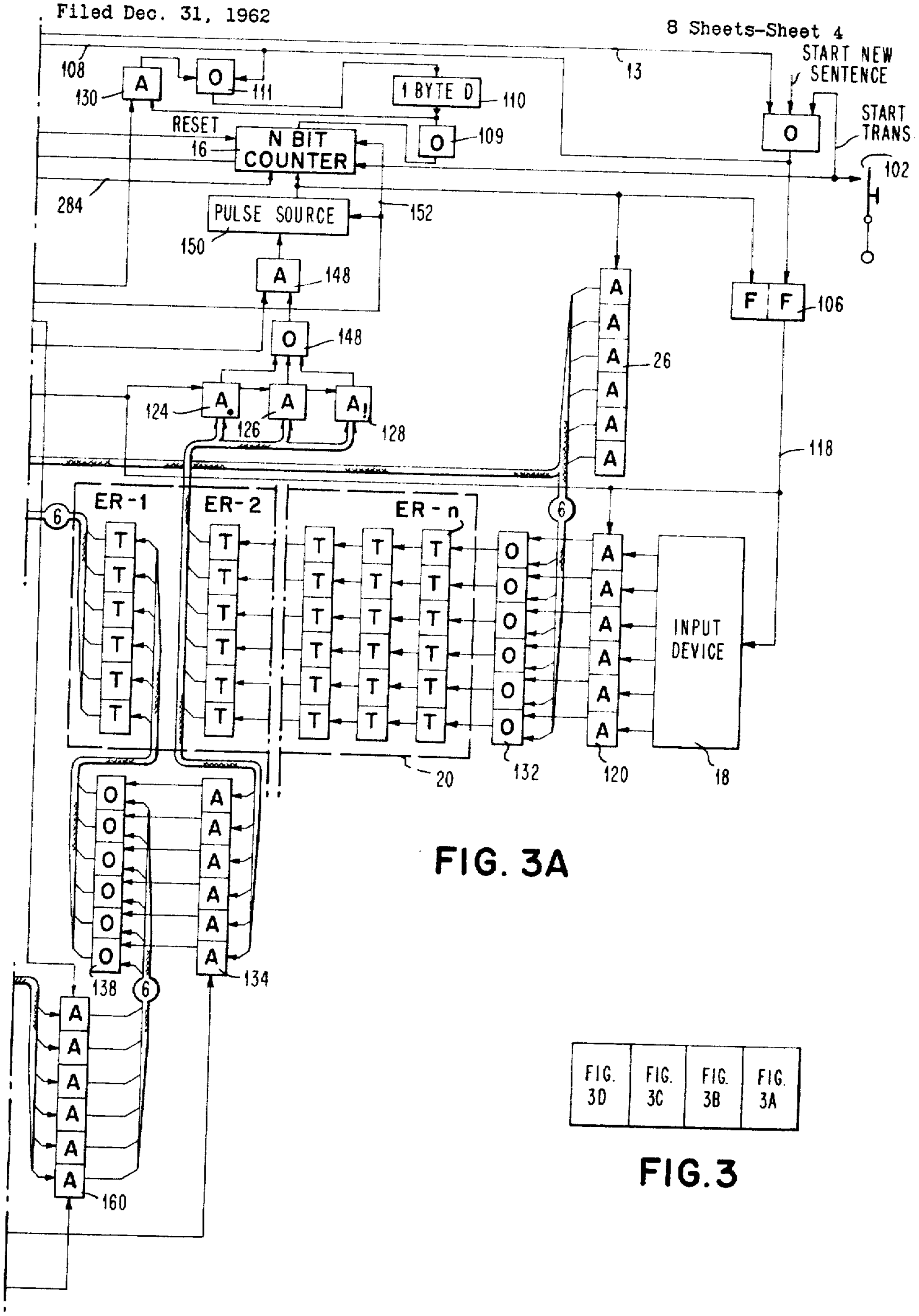
Figure 3B:
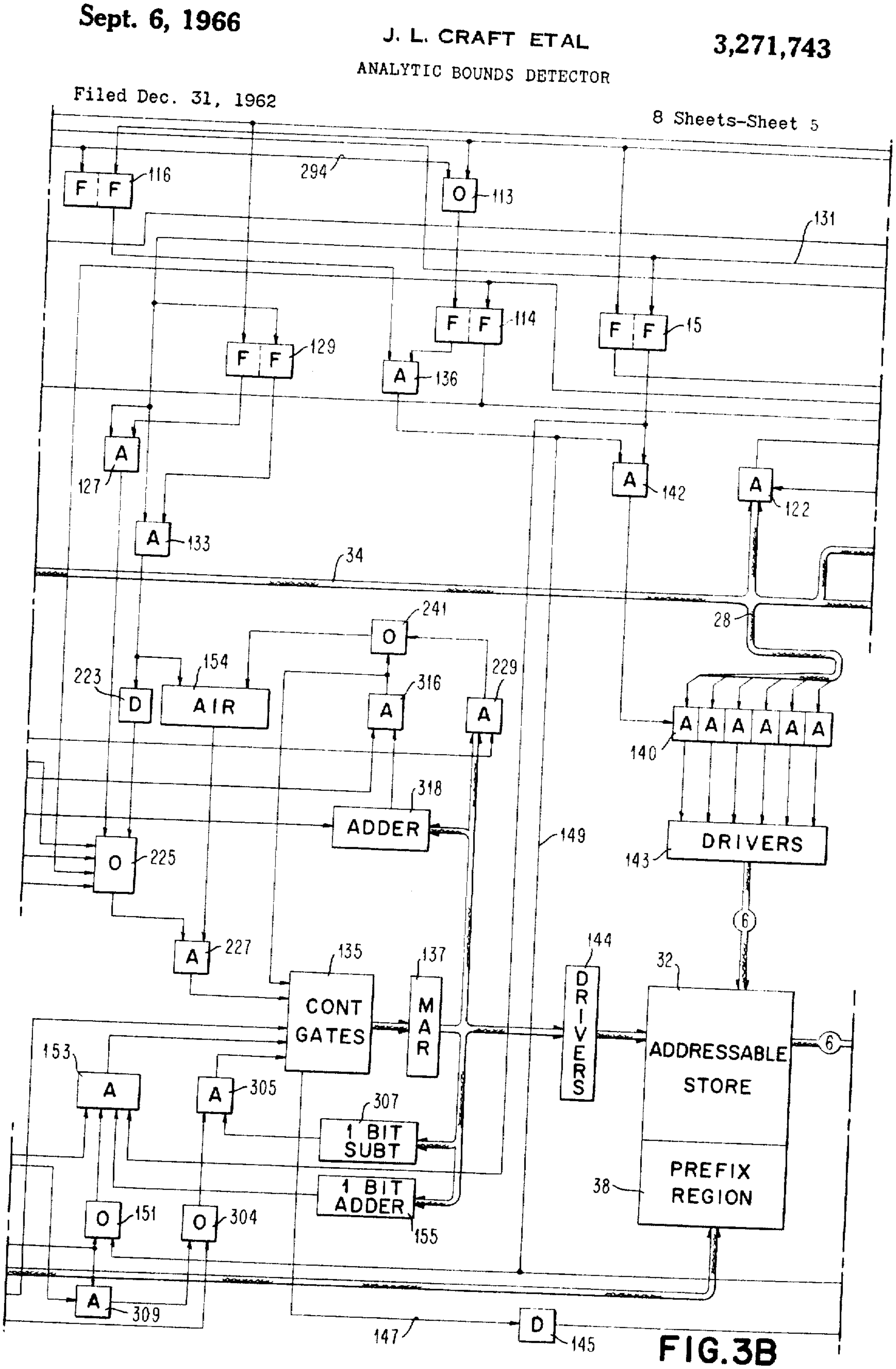
Figure 3C:
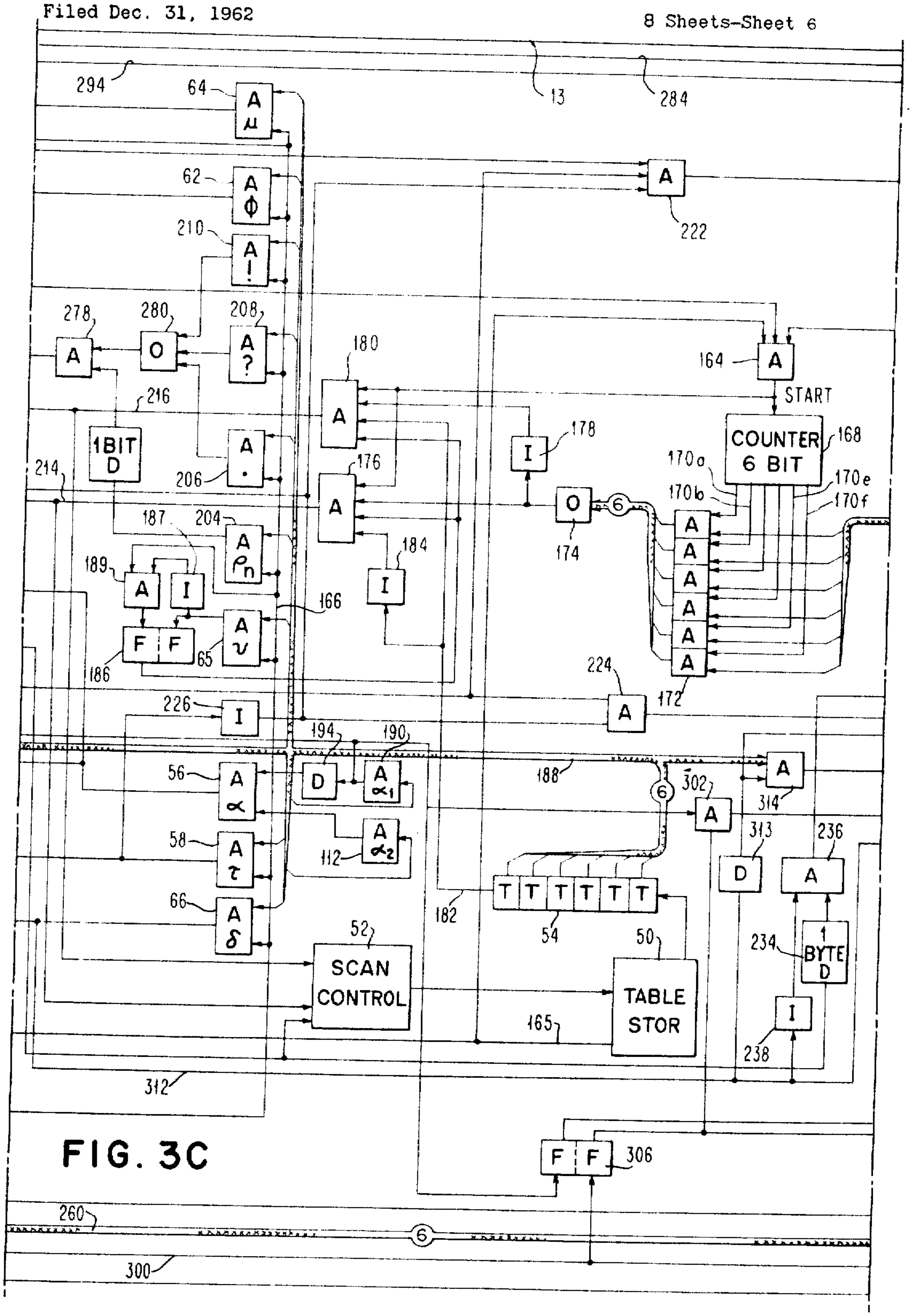
Figure 3D:
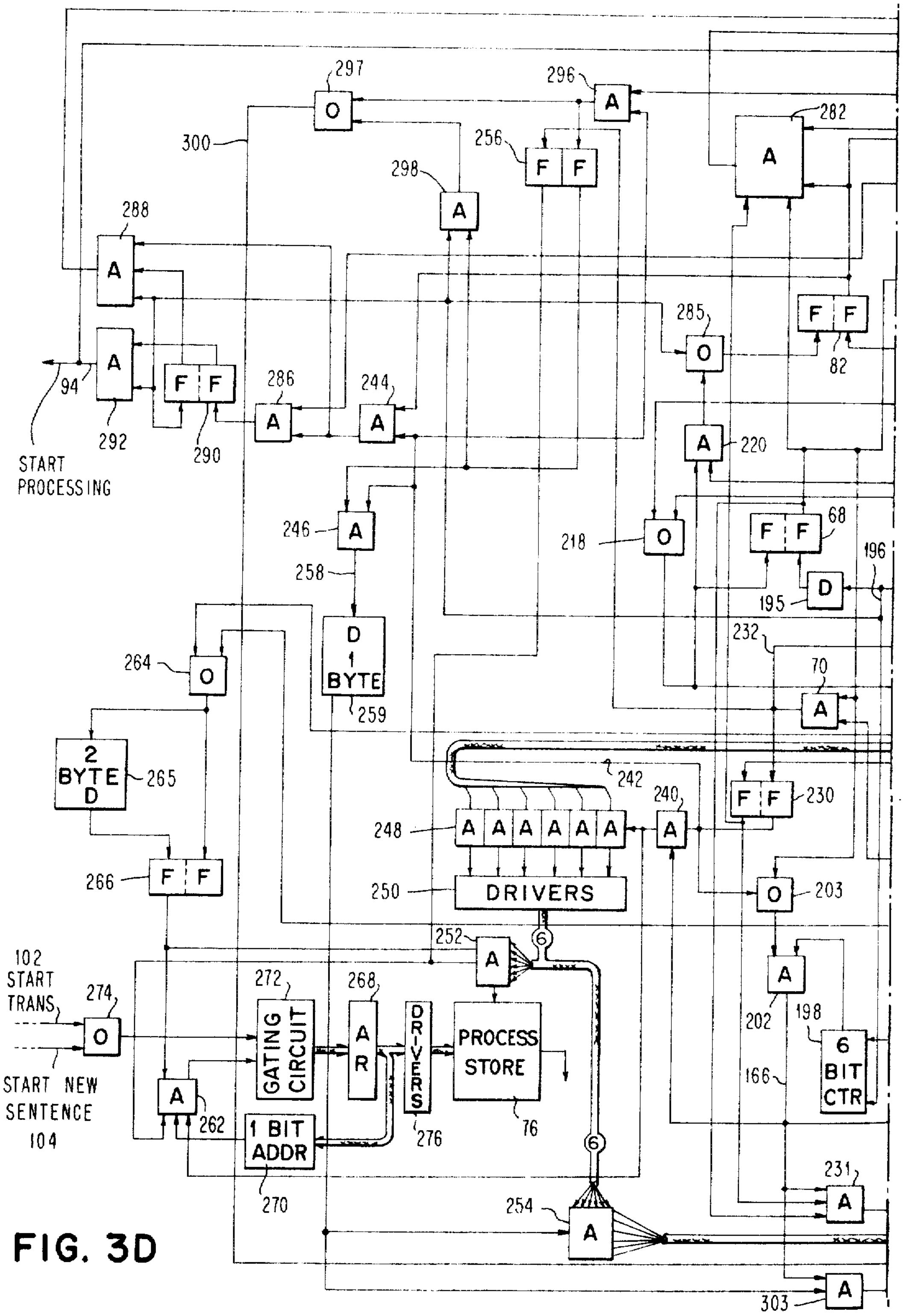
Figure 4:
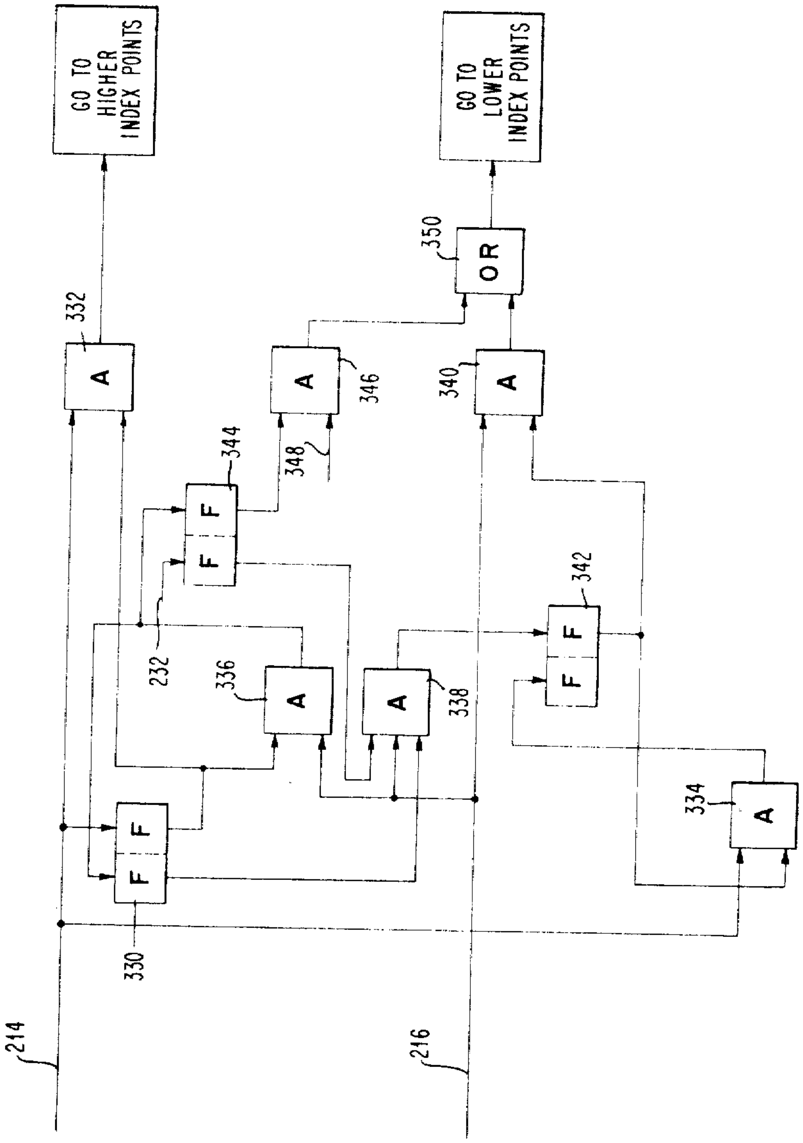

After the device has been switched to the search-input state, causing AND gate 164 to be partially conditioned, the scan which is being made of table storage 50 is continued until an output signal is derived from $\alpha_1\ \alpha_2$ detector AND gate 56 (FIG. 3C). This indicates that a scan is now being made of the beginning of a table entry argument and causes one byte time later flip-flop 68 to be switched to its ON state to cause the other conditioning signal to be applied to AND gate 64. The output from AND gate 56 is also applied through line 196 to reset counter 198 thereby resynchronizing the timing pulses on line 166 in a manner previously described.

Each output from AND gate 64 is applied to step counter 168 one position causing a timing pulse to be generated on a different one of the output lines 170. The first timing pulse out of counter 168 is applied through line **170*a* to the uppermost of the AND gates 172, causing the first bit of the byte representing the CAP character residing in ER–1 to be passed through OR gate 174 to AND gate 176 and through inverter 178 to AND gate 180. This bit is compared in AND gates 176 and 180 with the first bit of the table entry argument which is being shifted off from shift register 54 on line 182. If these bits are the same, a timing pulse is applied to line 170*b* to cause the second bit stored in stage ER–1 to be compared with the second bit of the table entry argument. If the first bits compared are not the same, an output signal is generated depending on which of the bits was a one bit, on either line 214 or line 216; if the input bit is the one which is a one bit a signal appears on line 214, whereas if the table entry bit is the one bit, an output signal appears on line 216. A mismatch signal on line 214 or 216 is passed through OR gate 218 to switch flip-flop 68 to its OFF state. This deconditions AND gate 164 to stop the flow of timing pulse from counter 168 and to decondition comparator AND gates 176 and 180. The mismatch signal is also applied to AND gate 224 and, assuming a $\tau$-mismatch has not occurred, is passed through this gate and through OR gate 225 to condition AND gate 227 to pass the contents of AIR through gating circuit 135** to MAR. The significance of the latter operation will be apparent later.

The signals on line 214 and 216 are also applied to scan control circuit 52, to, in conjunction with other information previously received by the scan control circuit, tell it in which direction and how much to adjust the scan so as to come substantially closer to the entry giving the longest possible match on the next scan.

The scan is repetitively adjusted in the manner described above until the byte stored in stage ER–1 is completely scanned by timing pulses on lines 170 and no mismatch signal has been generated. The circuit then seeks to match on subsequent input bytes in a manner to be described later until the proper entry is found in table storage 50. For this example assume that the proper entry has the CAP symbol as the only byte in its argument. Therefore, when a match is had on this entry, the byte stored in register 54 is the special character $\tau$. This fact is detected by $\tau$ detector AND gate 58 causing a signal to be applied to AND gate 70. This operation, in itself, does not, however, stop the compare operation. At the time that the $\tau$ is detected, flip-flop 230 is still in its OFF state. Flip-flop 68 is in its ON state and a signal is generated on line 166. The combined occurrence of these three conditions causes an output signal from AND gate 231 which is applied through OR gate 151 to AND gate 153. This fully conditions AND gate 153 to pass the contents of MAR, incremented by one in one-bit adder 155, through gating circuit 135 to MAR. This causes the byte stored in the second address of addressable store 32 to be read out through conditioned AND gates 160 and OR gates 138 to stage ER–1. OR gate 218 has not yet generated an output so flip-flop 68 is still in its ON state, conditioning AND gate 164 to pass conditioning signals to comparator AND gates 176 and 180 and to pass stepping pulses to counter 168. The device therefore attempts to match $\tau$ with the character stored in stage ER–1, for this example, the letter *h*. This, of course, causes a mismatch signal to be generated which signal switches flip-flop 68 to its OFF state thereby deconditioning AND gate 164. The other AND gates which are connected to the output of OR gate 218 do not generate an output since these AND gates are inhibited by the detection of a $\tau$ mismatch.

When AND gate 58 applies the signal to AND gate 70, this AND gate is conditioned by the ON-side output from flip-flop 68. AND gate 70 therefore generates an output signal which switches flip-flop 230 to its ON state. This match signal from AND gate 70 is also applied through line 232 and one byte delay 234 to AND gate 236. Since a $\delta$ character is not detected following the $\tau$ character, inverter 238 applies the other conditioning signal to AND gate 236, causing a signal to be applied to condition AND gate 239 to pass the contents of MAR through OR gate 241 into AIR. AIR is in this way updated to contain the address of the input character on which the mismatch was made. This is the *"h"* of the word *"he"* for the present example and is the first character on which the next match will be made.

Flip-flop 230 being switched to its ON state causes a conditioning signal to be applied to AND gate 240. When the $\tau$ byte has been completely shifted out of register 54, and the function byte following it completely shifted in, (i.e., one byte time later) line 166 applies the other conditioning signal to AND gate 240 to cause conditioning signals to be applied to AND gates 248 and 262. Since flip-flops 256 and 266 are in their OFF state, AND gates 252 are conditioned to pass the drive signals generated by drivers 250. These drive signals are generated when the byte stored in register 54 is passed through AND gates 248 and causes the first function byte for the CAP symbol to be stored in process store 76. AND gate 262 is, at this time, fully conditioned to cause the address stored in address register 268 to be passed through one-bit adder 270 and applied back through gating circuit 272 to the address register. The address register is, in this manner, incremented so that the next byte is stored in the address following the address in which the preceding byte was stored. Assuming that there is only one function byte for the table entry representing the CAP symbol, this byte is followed by the $\alpha_1$ $\alpha_2$ characters. The detection of the $\alpha_1$ character by detector AND gate 190 causes a signal to be applied through OR gate 264 to switch flip-flop 266 to its ON state. This deconditions AND gates 252 and 262 to inhibit the storing of the $\alpha_1$ $\alpha_2$ character in process store 76. Two byte times later flip-flop 266 is reset to its OFF state by an output signal from delay 265. When $\alpha_2$ is also recognized, AND gate 56 generates an output which is applied to switch flip-flop 230 off.

In addition to turning flip-flop 230 off, the signal out of AND gate 56 is also applied one byte delay 195. One byte time later, the output from delay 195 is applied to switch flip-flop 68 to its ON state thereby conditioning AND gate 164 to start the flow of timing pulse from counter 168 and to condition the comparator AND gates 176 and 180.

At this time, the letter *"h"* for the word *"he"* is in stage ER–1 and the circuit is initially attempting to match on this letter in a manner already described. Assuming, after several attempts, that a match is had on this letter, AND gate 231 is again fully conditioned and a signal is applied by this gate through OR gate 151 to AND gate 153 to allow the address in MAR to be incremented by one and to cause the byte in addressable store 32 at the address now stored in MAR to be read out through AND gates 160, and OR gates 138 into stage ER–1. The byte representing the character *"e"* of the word *"he"* is thus read into stage ER–1 to be matched upon.

Assuming that a match is not had on this second letter, a signal is applied through AND gate 224 and OR gate 225 to condition AND gate 227 to apply the contents of AIR to MAR, causing the first byte of the input character combination being scanned, in this case the *"h,"* to be read back into stage ER–1. The above described sequence of operations is repeated until a table entry argument is found which matches some length of the input, such as *"he,"* at which time AND gate 70 is fully conditioned to switch flip-flop 230 to its ON state and a signal is applied through AND gate 236 to AND gate 239 to cause the contents of MAR to be read into AIR updating this register to start the scan of the next character. The function for the matched-on table entry argument is read into succeeding addresses of process store 76 through conditioned AND gates 248 and 252 under control of address register 268.

The space between words may be handled in a number of different ways, but for the purpose of this discussion, it will be assumed that the spaces are matched on, the same as any other input entry. The input entries "SPACE," "visited," "SPACE," "the," and "SPACE" are matched on a similar manner and function entries representing these entries are read into succeeding addresses in process store 76.

The byte representing the capitalize symbol for the letter "U" of the abbreviation "U.N." is now in stage ER–1. Successive table entry scans are made until a match is made on this character. When a match is made on this character, a signal is applied through AND gate 231 and OR gate 151 to AND gate 153 to cause MAR to be incremented by one. This causes the byte stored in the address now in MAR, in this case the symbol representing the letter "U," to be read into stage ER–1. The circuit now attempts to match on this second byte in a manner previously described for other two byte combinations, until a table entry, the argument of which matches on these two characters, is located.

At this time, MAR is again updated and the byte stored in the address now in MAR read into stage ER–1. The circuit now attempts to match on the three byte combination "CAP U P*n*" and, when a match on these characters is had, the next character, the byte representing the period, is read into stage ER–1. When the character P*n* is applied to register 54, it causes AND gate 204 to apply a signal to one byte delay 277. If the next character applied by table storage 50 to register 54 were a period, question mark, or exclamation point, this fact would be detected by detectors 206, 208 or 210, respectively, causing a signal to be applied through OR gate 280 to fully condition AND gate 278 to switch flip-flop 82 to its ON state. For the argument of the entry for "U.N.," a byte following the byte representing P*n* would ordinarily be the byte representing a period. If this were the case, flip-flop 82 would be switched to its ON state, causing AND gate 282 to be fully conditioned for each succeeding byte applied to register 54. Therefore, for each byte applied to register 54 following the detection of the terminal-type punctuation, a signal would be applied by AND gate 282 to line 284 to increment counter 16 one position. This incrementing of counter 16 would continue until either a mismatch is detected between an input character and a character in the table entry argument or until the character $\tau$ is applied to register 54. The former of these conditions causes flip-flop 68 to be switched to its OFF stated deconditioning AND gate 282 while the latter of these conditions causes flip-flop 230 to be switched to its ON state likewise deconditioning AND gate 282. When a mismatch is detected subsequent to the switching of flip-flop 82 to its ON state AND gate 222 is fully conditioned to apply a reset signal to counter 16 to reset this counter to 0. However, as was mentioned previously, a $\tau$ mismatch does not cause an output from AND gate 222; therefore, counter 16 will be incremented only when an argument entry containing a terminal-type punctuation has matched on an input word and will continue to be incremented until the $\tau$ character is detected by $\tau$ detector AND gate 58.

However, the setting of punctuation flip-flop 82 would force either AND gate 288 or 292 to generate an output at the end of the entry and, as was mentioned previously, with abbreviations it is desired to defer this decision as to which of these AND gates should generate on output until a further test has been made. Therefore, for abbreviations, the character following the P$n$ byte is not the period byte but is, instead, the universal character ($\nu$).

The table entry for the abbreviation U.N. is as was mentioned previously.

$\alpha_1$ $\alpha_2$ CAP U P $n$ $\nu$ CAP N P $n\tau$ $\delta$ 2 (function characters for U.N.) $\mu$ $\rho$ AB $\alpha_1$ $\alpha_2$ Therefore, assuming that the scan control unit 52 has located the proper entry for the abbreviation U.N. in table storage 50, after the characters—CAP U P $n$—have been matched on, the next character applied to register 54 is the universal character $\nu$. This character is detected by $\nu$ detector AND gate 65, causing an output from this gate which switches flip-flop 186 to its ON state. When flip-flop 186 is in its ON state, comparator AND gate 176 and 180 are deconditioned so that as the bytes applied to line 182 are compared with the bits of the input byte being applied to OR gate 174, a failure of two bits to match does not cause a mismatch signal on line 214 or 216. Therefore, even if the character following the P$n$ byte in the input sequence was not a period symbol byte, the circuit still indicates a match. However, the byte following the P$n$ byte may only be a word terminating type punctuation such as a period, question mark, exclamation point, comma, semicolon or space byte and, while it is possible for a CAP U character combination to be followed by one of the symbols other than the period, it is improbable, almost to the point of being impossible, for any of the symbols other than the period to come between a CAP U and a CAP N where the CAP N is likewise followed by a punctuation mark. Therefore, the universal symbol may be used to obtain a match for the second byte of the period symbol used in an abbreviation, to avoid the setting of punctuation flip-flop 82, without any real danger of an input combination, other than the desired abbreviation, being recognized as the abbreviation.

The matching then proceeds in a manner already described until the end-of-argument character ($\tau$) is detected. This causes an output from $\tau$ detector AND gate 58 which is applied to fully condition AND gate 70. The output from AND gate 70 is applied to switch flip-flop 230 to its ON state and is also applied through line 232 to one byte delay 234. The $\delta$ byte applied next to register 54 is detected by $\delta$ detector 66 causing a signal on line 312 which prevents an output signal from being derived from inverter 238. AND gate 236 is therefore not conditioned when delay 234 applies a signal thereto and the contents of MAR are not applied to AIR as would ordinarily be the case.

The signal applied to line 312 is also applied through OR gate 225 to condition AND gate 227 and through one byte delay 313 to condition AND gates 314 and 316. The conditioning of AND gate 227 causes the contents of AIR to be applied to MAR. AND gate 314 is conditioned one byte time later when the contents of register 54 is the byte representing the numeral 2 and the contents of AIR is the address which was in MAR. The byte representing the numeral 2 is passed through AND gate 314 to be applied as one input to adder 318. The other input to this adder is the contents of MAR. The output from adder 318 is an address which is two positions advanced from that which was originally stored in AIR. This address is applied through gating circuit 135 to MAR and is passed through AND gate 316, which is at this time conditioned by the output from delay 313, and through OR gate 241 into AIR. The result of this operation is that, when the next matching operation is started, the first byte read out of addressable store 32 is the P$n$ byte following the U rather than the period byte following the N as would be the case during a normal operating cycle where the detection of a $\tau$ causes the contents of MAR to be read into AIR. The reason for this variation in the normal search procedure will be apparent later.

The output from $\delta$ detector AND gate 66 is also applied through OR gate 264 to switch flip-flop 266 to its ON state. When flip-flop 266 is in its ON state, AND gates 252 are deconditioned, preventing the application of function bytes to process store 76 and AND gate 262 is deconditioned to prevent the advancing of address register 268. Two byte times after flip-flop 266 is turned on, a signal is applied by delay 265 to the OFF-side input of flip-flop 266 to switch this flip-flop to its off state, thereby reconditioning AND gates 252 and 262 to allow the normal storage of information in process store 76. The effect of the above described operation is to prevent the reading of the $\delta$ byte and the numeral byte representing the numeral 2 into the process store.

The bytes follow the byte representing the numeral 2 in the function portion of the matched-on table entry are the function bytes for the input entry U.N. As was mentioned above, AND gates 248, 252 and 262 are conditioned when these bytes are applied to shift register 54 and these bytes are stored in process store 76 in the normal manner.

The next byte applied by table storage 50 to register 54 is the special character $\mu$. This is detected by $\mu$ detector AND gate 64 causing an output signal which is applied as one input to AND gate 296. The other input to this AND gate is derived from the ON-side output of flip-flop 230 through line 242. Since flip-flop 230 is in its ON state at this time, AND gate 296 generates an output which is applied to flip-flop 256 to switch this flip-flop to its ON state and is also applied through OR gate 297 and line 300 to switch flip-flop 306 to its ON state and to set the address of the last address in prefix region 38 into MAR. The switching of flip-flop 256 to its ON state causes a conditioning signal to be applied to AND gate 246. The other conditioning signal for this AND gate is derived from the ON-side output of flip-flop 230 through line 242. Since flip-flop 230 is in its ON state at this time, AND gate 246 generates an output on line 258 which is applied through one byte delay 259 to condition AND gate 254 to apply the drive signals from drivers 250 to addressable store 32. It should at this point be remembered that the switching of flip-flop 256 to its ON state deconditions AND gate 252 to prevent these drive signals from being applied to process store 76.

It can be seen from the above that, when the character $\mu$ is in register 54, neither AND gate 252 or 254 is conditioned. The storage of this special character is, in this way, inhibited. A signal on line 258 is also applied through delay 259, AND gate 303, and OR gate 304 to condition gate 305. AND gate 305 being conditioned, allows the output from MAR to be decremented by one in one bit subtractor 307, and fed back through AND gate 305 and gating circuit 135 to MAR. MAR is in this way counted down so that succeeding prefix bytes are applied to preceding address positions in prefix region 38.

For the example being considered, the abbreviation prefix ($\rho_{AB}$) is, in this manner, read into the last address of prefix region 38. The character following $\rho_{AB}$ is the first byte $\alpha_1$ of the end-of-entry character $\alpha_1$ $\alpha_2$. AND gates 248 and 254 are still conditioned at this time so that the $\alpha_1$ byte is read into prefix region 38 at the address preceding that in which $\alpha_{AB}$ was stored. The use which this character is put to will be described later.

The detection of the $\alpha_1$ byte by $\alpha_1$ detector AND gate 190 also causes a signal to be applied through conditioned AND gate 302 to gate the contents of AIR into MAR, a signal to be applied to switch flip-flop 306 to its OFF state and a signal to be applied to one byte delay 194. When the $\alpha_2$ byte is detected during the next byte time by AND gate 192, AND gate 56 is fully conditioned, causing an output signal to be applied through line 212 to fully condition AND gate 298. The output from AND gate 298 is applied through OR gate 297 and line 300 to switch flip-flop 306 back to its ON state and through gating circuit 135 to set MAR to the last address in prefix region 38. The output from the ON side of flip-flop 306 is applied to condition AND gate 309. When the other conditioning input is applied to this AND gate, an output signal is applied through OR gate 304 to condition AND gate 305. The reason that it is necessary to switch on flip-flop 306 to perform this function is that the output from AND gate 56 is also applied to turn flip-flop 230 off, thereby deconditioning AND gate 246 and removing the signal from line 258.

The switching of MAR to the last address in the prefix region causes drivers 144 to be energized to read the contents of this address, the abbreviation prefix character ($\rho_{AB}$), through AND gates 160 and OR gates 138 into stage ER–1. The previously mentioned signal out of AND gate 56 is applied one byte time later to switch flip-flop 68 to its ON state conditioning AND gate 164, to allow the passage of stepping pulses to counter 168 and of conditioning pulses to AND gates 176 and 180. A prefix search is, in this way, started.

AND gates 176 and 180 operate in the same manner to indicate a mismatch or a match when a prefix search is being performed as when a normal search is being performed and the mismatch output signal from OR gate 218 causes the same operations to be performed. However, the reading of AIR into MAR caused by the output signal from AND gate 224 has no significance when a prefix search is being performed. Flip-flop 256 remains on during the prefix search, and, therefore, when $\alpha_1$ $\alpha_2$ are detected at the end of the table entry; AND gate 298 generates an output signal which is applied through OR gate 297 and line 300 to switch flip-flop 306 to its ON state and to set the last address in prefix region 38 into MAR. As a result, a prefix search always starts with the prefix byte stored in the last address of the prefix region rather than with the byte stored in the address indicated by AIR.

When an entry is located in table storage 50, the first argument character of which matches the abbreviation-prefix character ($\rho_{AB}$) stored in stage ER–1, AND gate 231 generates an output signal which is applied as one input to AND gate 309. This AND gate is conditioned by the output from the ON side of flip-flop 306 so that it generates an output signal which is applied through OR gate 304 and AND gate 305 to cause the address stored in MAR to be decremented by one. The byte stored in the next-to-the-last address of prefix region 38, in this example the $\alpha_1$ byte, is thus read out from prefix region 38 through AND gates 160 and OR gates 138 into stage ER–1. A match is then attempted on this character too. If this attempted match is unsuccessful, flip-flop 68 is reset. This deconditions AND gate 164 to stop the compare operation. Scan control circuit 52 is energized to select a new table entry. When the next beginning-of-entry character is detected by AND gate 56, AND gate 298 generates an output signal which is passed through OR gate 297 and line 300 to reset MAR to the last address in the prefix region causing the abbreviation prefix to be restored in stage ER–1.

If a match is had on both the $\rho_{AB}$ and the $\alpha_1$ characters, the detection of the $\alpha_1$ character by AND gate 190 is caused as an indication of the fact that the search in the prefix region has been completed and that the search should be continued using input characters from the normal region of addressable store 32. The output from AND gate 190 is, therefore, applied to switch flip-flop 306 to its OFF state, and through conditioned AND gate 302 to cause the contents of AIR to be inserted into MAR. It will be remembered, that, due to the $\alpha_1$ instruction in the function of the previously matched-on table entry, the address in AIR is the address at which the P*n* byte following the U is stored. This character is, therefore, read into stage ER–1, and an attempt is made to match on it. If the attempted match is unsuccessful, flip-flop 68 is reset to stop the compare operation. After an adjustment in the scan, the next $\alpha_1$ $\alpha_2$ character detected causes an output from AND gate 298 through OR gate 297 and line 300 which switches flip-flop 306 on and which inserts the last address in prefix region 38 into MAR, causing the abbreviation prefix character to be returned to stage ER–1. The above described sequence of operations will occur whenever, in the remaining parts of the search, a mismatch is detected (with the exception of course of a $\tau$ mismatch) and will not be described again. If there is a match on the P*n* character, the circuit proceeds in a normal manner, there being an output signal from AND gate 231 through OR gate 151 to AND gate 153 to cause the address in MAR to be incremented one position. This will cause the second period byte following the U to be read into stage ER–1.

The detection of the P*n* byte by AND gate 204 caused a signal to be applied to one byte delay 277. If the period byte in stage ER–1 is also matched on, AND gate 206 applies a signal through OR gate 280 to fully condition AND gate 278 causing punctuation flip-flop 82 to be switched to its ON state. Since flip-flop 230 is in its OFF state at this time, this fully conditions AND gate 282 causing counter 16 to be incremented for each subsequent byte matched upon, and also applies a conditioning signal to AND gate 222. It will be remembered, from a previous section of this description, that the table entry which a match is being sought on at this time is of the following form:

$\alpha_1$ $\alpha_2$ $\rho_{AB}$ $\alpha_1 P_n$ PERIOD $\nu$ $\nu$ $P_n$ PERIOD $P_n$ SPACE $P_n$ SPACE CAP $\tau$ (function for SPACE SPACE CAP) $\phi$ $\alpha_1$ $\alpha_2$ Therefore, if this entry, or one similar to it, has been found, the next two characters in the table entry are universal characters and will match on any input character applied to stage ER–1. The reason these characters are capable of matching on any input byte is that, when one of them is detected, flip-flop 186 is switched to its ON state, deconditioning comparator AND gates 176 and 180, thereby inhibiting the generation of a mismatch signal. The—CAP N—bytes of the abbreviation U.N. are matched on in this way during the preflix search.

For the sake of illustration, let it be assumed that the correct table entry, the entry indicated above, has not yet been located, and that, while there has been a match up to this point, a mismatch occurs when an attempt is made to match on the next P*n* byte applied through stage ER–1. The detection of this mismatch causes a signal to be applied through conditioned AND gate 220 and OR gate 285 to reset punctuation flip-flop 82 to its OFF state and a signal to be applied through conditioned AND gate 222 to reset counter 16 to 0. The remaining operations which result in the restoring of the abbreviation prefix ($\rho_{AB}$) into a stage ER–1 have already been described in detail and will not be described again. A new attempt to obtain a match is then begun, starting with the abbreviation prefix stored in stage ER–1.

Assume now that the proper entry in table storage 50 has been located. Matching will then proceed as described above, until the first P*n*-PERIOD combination is detected passing through register 54. This switch punctuation flip-flop 82 to its ON state thereby starting the incrementing of counters 16. Matching then proceeds in a normal fashion, counter 16 being incremented one position for each byte matched until the character $\tau$ is detected in register 54 by AND gate 58. The output signal from AND gate 58 is applied to AND gate 70 causing an output therefrom. This output is applied to switch flip-flop 230 to its ON state, and is also applied to switch flip-flop 256 to its OFF state. The circuit now attempts to match the bits of the $\tau$ character passing out on line 182 with the bits now stored in stage ER–1, the byte for the first letter of the first word of the new sentence. This attempted match results in a $\tau$ mismatch which among other things, resets flip-flop 68 to its OFF state. The switching of flip-flop 230 to its ON state deconditions AND gate 282 to prevent the further incrementing of counter 16. The counter has a count of nine stored in it at this time.

Since flip-flop 256 is in its OFF state at this time, and flip-flop 230 is in its ON state, AND gates 248 and 252 are conditioned as each function byte is applied to register 54 and pass these bytes under control of address register 268 into process store 76. When the end-of-sentence character $\phi$ is detected by AND gate 62, a signal is applied through conditioned AND gate 286 to switch flip-flop 290 to its ON state.

Flip-flop 290 being in its ON state, conditions AND gate 292 so that, when the end-of-entry character $\alpha_1$ $\alpha_2$ is detected by AND gate 56, AND gate 292 generates an output signal on line 94 which signal is applied back through line 294 to switch flip-flops 114 and 116 to their OFF states, thereby switching the circuit to its not-in-use state, and applying a signal to the language processing device (not shown) to cause the processing of the information stored in process store 76 to commence.

It should be noted that the special character $\phi$ is stored in process store 76 but the detection of the $\alpha_1$ byte by AND gate 190 causes a signal to be applied through OR gate 264 to switch flip-flop 266 to its ON state thereby inhibiting the storage of the $\alpha_1$ $\alpha_2$ bytes in process store 76.

When the sentence stored in process store 76 has been processed, a signal is applied to line 100. This signal passes through OR gate 10 to switch flip-flop 106 to its ON state and is also applied by OR gate 10 to line 108 to switch the circuit to its load-input state, to turn OFF flip-flop 15 and to start the decrementing of counter 16. At this time, counter 16 has a count of nine stored therein and edit register 20 has some byte which has already been processed stored in stage ER–1, nine other bytes which have already been processed in stages ER–2 through ER–10 and six bytes of a new sentence in the remaining stages. Flip-flop 15 remains in its OFF state to inhibit the storage of bytes in addressable store 32 and the advancing of MAR until counter 15 has counted down to 0 and all of the bytes stored in edit register 20 which have already been processed have been shifted off. At this time, the counter applies a signal to line 131 to switch flip-flop 15 to its ON state, to allow the storage of input data in addressable store 32 to commence, and to reset AIR and MAR to zero.

In the preceding example, it was assumed that the abbreviation U.N. ended a sentence. Assume now that the sentence to be processed is—He visited the U.N. in New York—. The sequence of operation for this input sentence would be identical for that for the preceding example until the prefix scan is started.

In this example, the abbreviation U.N. is followed by a single space and then a small letter. As was mentioned previously, there is no table entry having an argument of the following form:

$$\alpha_1\ \alpha_2\ \rho_{AB}\ \alpha_1\ P_n\ \text{PERIOD}\ \nu\ \nu\ P_n\ \text{PERIOD}\ \text{SPACE}\ \tau\ \text{(function)}\ \phi\ \alpha_1\ \alpha_2$$

Therefore, when a match is had it will be on an entry of the following form:

$$\alpha_1\ \alpha_2\ \rho_{AB}\ \alpha_1\ P_n\ \text{PERIOD}\ \nu\ \nu\ P\ \text{PERIOD}\ \tau\ \alpha_1\ \alpha_2$$

Two things are noted about this entry which differ from the entry which was matched on in the previous example. First of all, the function of this table entry does not contain the end-of-sentence character ($\phi$). Secondly, there are only four bytes following the first terminal-type punctuation in this entry rather than the nine bytes following the P*n*-PERIOD sequence in the preceding example. Therefore, when AND gate 56 detects the byte combination $\alpha_1$ $\alpha_2$ following this entry, counter 16 has a count of four stored therein and flip-flop 290 is in its OFF state, conditioning AND gate 288 rather than AND gate 292. AND gate 288 is fully conditioned at this time to generate an output signal on line 13 which signal is applied to switch flip-flop 129 to its OFF state and through OR gate 10 to line 108 and to switch flip-flop 106 to its ON state. The signal on line 108 is applied, as before, to start the decrementing of counter 16, to switch flip-flop 15 to its OFF state, and to switch flip-flop 116 to its ON state and flip-flop 114 to its OFF state, thereby switching the device to the load-input state. The output from the ON side of flip-flop 106 is applied to turn on input device 18, to condition AND gates 120, and to condition terminal-type punctuation detectors 122, 124, 126 and 128.

At this time, counter 16 has a count of four stored therein and edit register 20 has the last byte processed stored in stage ER–1, and additional bytes which have already been processed stored in stages ER–2 through ER–5, and eleven bytes of unprocessed input bytes in its remaining stages. Flip-flop 15 being in its OFF state, AND gates 140 and 153 are deconditioned thereby preventing bytes shifted off of stage ER–1 from being applied to addressable store 32 and preventing the incrementing of MAR. When counter 16 counts down past 0, a signal is applied to line 131 to switch flip-flop 15 to its ON state to condition AND gates 140 through AND gate 142 and AND gate 153. The signal on line 131 is applied through conditioned AND gate 127 and OR gate 225 to condition AND gate 227 to pass the contents of AIR into MAR. This allows the first input byte for the word "in" of the portion of the sentence "in New York." to be applied to the address in addressable store 32 following the address in which the last input byte matched on during the last search input state (for this example, the second period byte following the "*n*"), is stored. The reason for this procedure was explained in the previous section. The signal on line 131 also resets flip-flop 129 to its ON state.

The loading of addressable store 32 proceeds in a manner already described until the two bytes representing the period at the end of the sentence are applied to stages ER–1 and ER–2. The presence of the period bytes in these two stages causes AND gates 122 and 124 to generate simultaneous output signals which signals are applied to AND gate 148. The output signal from AND gate 148 starts pulse source 150. Flip-flop 106 is turned OFF and counter 16 and edit register 20 cycled in a manner already described to store the 15 bytes following the period bytes in addressable store 32. An overflow signal on line 152 from counter 16 is then applied to flip-flop 114 to switch this flip-flop to its ON state, thereby switching the circuit to the search-input state, and is applied through OR gate 225 to AND gate 227 to cause the address in AIR to be read into MAR. This is the address in addressable store 32 in which the byte for the letter "*i*" of the word "*in*" is stored.

The entry "*in*" is then matched on, and the function of the entry which is matched on is read into process store 76. The entries "SPACE" and "New York" are also matched on and their corresponding functions read into process store 76. At this time, stage ER–1 contains the P*n* byte for the period at the end of the sentence. When this byte is matched on, the byte representing the period is read into stage ER–1. When a table entry is found which matches both of these bytes, AND gate 278 generates an output signal to switch punctuation flip-flop 82 to its ON state, causing counter 16 to be incremented for each subsequent byte matched on until an end-of-argument character ($\tau$) is detected.

The matching on the two bytes of the period will continue, each mismatch on subsequent characters causing a signal to be applied through AND gate 220 to reset punctuation flip-flop 82 and a signal through AND gate 222 to reset counter 16, until an entry is scanned having the following form:

$$\alpha_1\ \alpha_2\ P_n\ \text{PERIOD}\ P_n\ \text{SPACE}\ P_n\ \text{SPACE CAP}\ \tau\ \text{(function bytes for PERIOD SPACE SPACE CAP)}\ \phi\ \alpha_1\ \alpha_2$$

A match is had on this entry, with a count of five being read into counter 16 before the end-of-argument character ($\tau$) is detected by detector 58. The function for this entry is read into process store 76. The detection of the $\phi$ character in the function of this entry causes an output signal from AND gate 286 which switches flip-flop 290 to its ON state. When the end-of-entry character $\alpha_1 \alpha_2$ is detected, AND gate 56 generates an output signal over line 212 which is applied through conditioned AND gate 292 to generate an output signal on line 94. This signal is applied through line 294 to switch the circuit to its not-in-use state and is applied to the language processing machine (not shown) to cause the processing of the information stored in process store 76 to commence. When the processing of this information is completed, a signal is applied to line 100 to start the reading in of a new sentence in a manner already described.

While the invention has been particularly shown and described with reference to a preferred embodiment thereof, it will be understood by those skilled in the art that various changes in form and details may be made therein without departing from the spirit and scope of the invention.

What is claimed is:

1. A device for determining the end of an information unit in a sequence of coded data where the end-of-unit symbol in the coded data may have other significance comprising:

first storage means;

input means for applying said coded data sequence to said first storage means;

means for detecting an end-of-unit symbol in the data applied to said storage means;

means responsive to the detection of said end-of-unit symbol for causing said input means to apply a predetermined number of symbols following said end-of-unit symbol in said sequence to said storage means and for then inhibiting further operation of said input means;

second storage means containing in a systematic order, an entry representing each possible form in which an end-of-unit symbol may appear with the symbols before and after it;

means for comparing the symbols stored in said first storage means with the symbols stored in said second storage means, and means responsive to a match being detected between symbols, including an end-of-unit symbol, in said first storage means and a given entry in said second storage means for indicating the end of an information unit.

2. A device for determining the end of an information unit in a sequence of coded data where the end-of-unit symbol in the coded data may have other significance comprising:

a storage means;

input means for applying said coded data sequence to successive positions in said storage means;

means for detecting an end-of-unit symbol in the data applied to said storage means;

means responsive to the detection of said end-of-unit symbol for causing said input means to apply a predetermined number of symbols following said end-of-unit symbol in said sequence to successive positions in said storage means and for then inhibiting further operation of said input means;

means for storing a table containing, in a systematic order, an entry representing each possible form in which an end-of-unit symbol may appear with the symbols before and after it;

means for comparing the symbols stored in said storage means with the symbols stored in said table;

means responsive to a match being detected between symbols, including an end-of-unit symbol, in said storage means and one of a first plurality of entries in said table for indicating the end of an information unit;

and means responsive to a match being detected between symbols, including an end-of-unit symbol, in said storage means and one of a second plurality of entries in said table for indicating that the end of an information unit has not been reached.

3. A device for determining the end of an information unit in a sequence of coded data where the end-of-unit symbol in the coded data may have other significance comprising:

shift register means having a plurality of stages and having an output from the last stage thereof;

input means for applying said coded data sequence to said shift register means;

addressable storage means;

means for normally applying the successive outputs from the last stage of said shift-register means to successive address positions in said addressable storage means;

means for detecting an end-of-unit symbol in said shift register means;

means responsive to the detection of said symbol for inhibiting said input means from applying additional coded data to said shift register means and for causing the contents of said shift register means to be fed into successive address positions of said addressable storage means;

means for storing a table in which each symbol, including the end-of-unit symbols, of said code is stored in a systematic order, said table including an end-of-shift symbol entry representing each possible form in which an end-of-unit symbol may appear with the symbols before and after it, said end-of-unit symbol entries being divided into a first plurality and a second plurality of entries;

means for comparing the symbols stored in said addressable storage means with the symbols stored in said table;

means responsive to a match being detected between symbols, including an end-of-unit symbol, in said addressable storage means and one of said first plurality of entries in said table for indicating that the end of an information unit has been detected, and means responsive to a match being detected between symbols, including an end-of-unit symbol, in said addressable storage means and one of said second plurality of entries in said table for indicating that the end of an information unit has not been detected.

4. A device for determining the end of a sentence in a sequence of coded language characters having coded symbols for terminal-type punctuation marks comprising:

a storage means;

input means for applying said coded language sequence to said storage means;

means for detecting a terminal-type punctuation symbol in the coded characters applied to said storage means;

means responsive to the detection of said terminal-type punctuation symbol for causing said input means to apply a predetermined number of characters following said terminal-type punctuation symbol to storage means and for then inhibiting further operation of said input means;

means for storing a table containing, in a systematic order, a punctuation entry representing each possible form in which a terminal-type punctuation symbol may appear with the coded language data before and after it, said punctuation entries being divided into a first and a second plurality of entries;

means for comparing the language data stored in said storage means with the entries stored in said table;

means responsive to a match being detected between language characters, including a terminal-type punctuation symbol, in said storage means and one of said first plurality of entries in said table for indicating that end of a sentence has been detected;

and means responsive to a match being detected between language characters, including a terminal-type punctuation symbol, in said storage means and one of said second plurality of entries in said table for indicating that the end of a sentence has not been detected.

5. A device for determining the end of a sentence in a sequence of coded language characters having coded symbols for terminal-type punctuation marks comprising:

shift register means having a plurality of stages and having an output from the last stage thereof;

input means for applying said coded language characters to said shift register means;

addressable storage means;

means for normally applying the successive outputs from the last stage of said shift-register means to successive address positions in said addressable means;

means for detecting a terminal-type punctuation symbol in said shift register means, means responsive to the detection of said symbol for inhibiting said input means from applying additional language characters to said shift register means and for causing the contents of said shift register means to be fed into successive address positions of said addressable storage means;

means for storing a table in which is stored, in a systematic order, an entry for each normal word of the input sequence and a punctuation entry representing each possible form in which a terminal-type punctuation symbol may appear with the characters before and after it, said punctuation entries being divided into a first and a second plurality of entries;

means for comparing the language characters stored in said storage means with the entries stored in said table;

means responsive to a match being detected between language characters, including a terminal-type punctuation symbol in said storage means and one of said first plurality of entries in said table for indicating that the end of a sentence has been detected;

and means responsive to a match being detected between language characters, including a terminal-type punctuation symbol, in said storage means and one of said second plurality of entries in said table for indicating that the end of a sentence has not been detected.

6. A device for determining the end of a sentence in a sequence of coded langauge characters having coded symbols for terminal-type punctuation marks comprising:

shift register means having a plurality of stages and having an output from the last stage thereof;

input means for applying said coded language characters to said shift register means;

addressable storage means;

means for normally applying the successive outputs from the last stage of said shift-register means to successive address positions in said addressable storage means;

means for detecting a terminal-type punctuation symbol in said shift register means, means responsive to the detection of said symbol for inhibiting said input means from applying additional language characters to said shift register means and for causing the contents of said shift register means to be fed into successive address positions of said addressable storage means;

means for storing a table in which is stored, in a systematic order, an entry for each normal word of the input sequence and a punctuation entry representing each possible form in which a terminal-type punctuation symbol may appear with the characters before and after it, said punctuation entries being divided into a first and a second plurality of entries;

means for comparing the langauge characters stored in said storage means with the entries stored in said table;

a punctuation detector means;

a punctuation indicator means;

means responsive to the detection by said detector means of a terminal-type punctuation in a table entry for setting said punctuation indicator means;

first recognizer means responsive to a match being detected between language characters in said storage means and one of said first plurality of entries in said table for indicating, when said indicator means is set, that the end of a sentence has been detected;

second recognizer means responsive to a match being detected between language characters in said storage means and one of said second plurality of entries in said table for indicating, when said indicator means is set, that the end of a sentence has not been detected;

means responsive to the detection of the table entry for an abbreviation for inhibiting the setting of said indicator means, and therefore the operation of said recognizer means;

and means responsive to the matching on an entry for an abbreviation in said table for causing the language characters stored in said addressable storage means, starting with the first period of the abbreviation, to be reapplied to said comparing means, the table entry being matched on during this recompare operation having terminal-type punctuation symbols therein, and being one of either said first or second plurality of entries, whereby said indicator means is set during the recompare operation causing an output to be generated by either said first or second recognizer means.

7. A device for determining the end of a sentence in a sequence of coded langauge characters having coded symbols for terminal-type punctuation marks comprising:

shift register means having a plurality of stages and having an output from the last stage thereof;

input means for normally applying said coded language characters to said shift register means;

addressable storage means;

loading means for normally applying the successive outputs from the last stage of said shift-register means to successive address position in said storage means;

means for detecting a terminal-type punctuation symbol in said shift register means;

means responsive to the detection of said symbol for inhibiting said input means from applying additional language data to said shift register means, for causing a ring-shift operation of said shift register, and for causing the existing contents of said shift register means to be fed into successive address positions of said storage means;

means for storing a table in which is stored, in a systematic order, an entry having an argument representing each normal word of the input data sequence and an entry having an argument representing each possible form in which a terminal-type punctuation symbol may appear with the characters before and after it, there being function data following the argument data in each table entry;

means for comparing the language characters stored in said addressable storage means with the arguments of entries stored in said table;

terminal type punctuation indicator means;

means responsive to the detection of a terminal-type punctuation in the argument of a table entry for setting said punctuation indicator means;

means for detecting an end-of-sentence character in the function of a table entry;

first recognizer means responsive to a match being detected between language characters in said storage means and a table entry in the function of which an end-of-sentence character is detected for indicating, when said punctuation indicator means is set, that the end of a sentence has been detected;

and second recognizer means responsive to a match being detected between language characters in said storage means and a table entry in the function of which an end-of-sentence character is not detected for indicating, when said punctuation indicator means is set, that the end of a sentence has not been detected.

8. A device for determining the end of a sentence in a sequence of coded language characters having coded symbols for terminal-type punctuation marks comprising:

shift register means having a plurality of stages and having an output from the last stage thereof;

input means for normally applying said coded language characters to said shift register means;

addressable storage means, loading means for normally applying the successive outputs from the last stage of said shift-register means to successive address position in said storage means;

stage indicating means for indicating the number of stages of said shift register means which, when said input means is started, contain either no data or unwanted data;

means for inhibiting said loading means when there is a non-zero indication in said stage indicating means;

means for detecting a terminal-type punctuation symbol in said shift register means, means responsive to the detection of said symbol for inhibiting said input means from applying additional language data to said shift register means, for causing a ring-shift operation of said shift register, and for causing the existing contents of said shift-register means to be fed into successive address positions of said storage means;

means for storing a table in which is stored, in a systematic order, an entry having an argument representing each normal word of the input data sequence and an entry having an argument representing each possible form in which a terminal-type punctuation symbol may appear with the characters before and after it, there being function data following the argument data in each table entry;

means for comparing the language characters stored in said addressable storage means with the arguments of entries stored in said table;

terminal-type punctuation indicator means;

means responsive to the detection of a terminal-type punctuation in the argument of a table entry for setting said punctation indicator means;

means including said stage indicating means for recording the number of argument characters in a table entry following the first terminal type punctuation;

means responsive to a mismatch being detected by said comparing means for resetting said punctuation indicator means and said recording means;

means for detecting an end-of-sentence character in the function of a table entry;

first recognizer means responsive to a match being detected between language characters in said storage means and a table entry in the function of which an end-of-sentence character is detected for indicating when said punctuation indicator means is set, that the end of a sentence has been detected;

and second recognizer means responsive to a match being detected between language characters in said storage means and a table entry in the function of which an end-of-sentence character is not detected for indicating, when said punctuation indicator means is set, that the end of a sentence has not been detected.

9. A device for determining the end of a sentence in a sequence of coded language characters having coded symbols for terminal-type punctuation marks comprising:

shift register means having a plurality of stages and having an output from the last stage thereof;

input means for normally applying said coded language characters to said shift register means;

addressable storage means, means for selecting the address in the addressable storage means into which data is to be stored on from which it is to be read;

loading means for normally applying the successive outputs from the last stage of said shift-register means to successive address position in said storage means under control of said adder selecting means;

means for detecting a terminal-type punctuation symbol in said shift register means, means responsive to the detection of said symbol for inhibiting said input means from applying additional language data to said shift register means, for causing ring-shift operation of said shift register, and for causing the existing contents of said shift register means to be fed into successive adder positions of said storage means;

means for storing a table in which is stored, in a systematic order, an entry having an argument representing each normal word of the input data sequence and an entry having an argument representing each possible form in which a terminal-type punctuation symbol may appear with the characters before and after it, there being function data following the argument data in each table entry;

means for comparing the language characters stored in said addressable storage means with the arguments of entries stored in said table;

process storage means, means responsive to the detection of a match between language characters in said addressable storage means and the argument of an entry in said table for causing the function corresponding to said argument to be read into said process storage means;

terminal-type punctuation indicator means;

means responsive to the detection of a terminal-type puctuation in the argument of a table entry for setting said punctuation indicator means;

means responsive to a mismatch being detected by said comparing means for resetting said punctuation indicator means;

means for detecting an end-of-sentence character in the function of a table entry;

first recognizer means responsive to a match being detected between language characters in said storage means and a table entry in the function of which an end-of-sentence character is detected for indicating, when said punctuation indicator means is set, that the end of a sentence has been detected;

second recognizer means responsive to a match being detected between language characters in said storage means and a table entry in the function of which an end-of-sentence character is not detected for indicating, when said punctuation indicator means is set, that the end of a sentence has not been detected;

means responsive to the detection of a universal character in a table entry argument for inhibiting the generation of a mismatch indication by said comparing means;

means responsive to the detection of a start-prefix character in a table entry function for causing the subsequent function characters to be read into a special region of the addressable storage means rather than into said process storage means and for causing said address selecting means to read the characters stored in said special region out prior to the characters in the normal region of said addressable storage means during the next comparison in said comparing means;

means responsive to the detection of a jump character in a table entry for causing the character following the jump character to be applied to said address selecting means to modify the adder in the normal region of said addressable storage means from which the first language data character will be taken to be applied to said comparing means;

the table entry for an abbreviation having a universal character substituted for each of the periods therein, a start-prefix symbol in its function followed by an abbreviation prefix character, and a jump character followed by a character which, when applied to said address selecting means, causes the symbol for the first period of the abbreviation to be the first character read out from the normal region of said addressable storage means during the next compare operation;

whereby the setting of said punctuation indicator means, and therefore, the operation of said recognizer means, is inhibited during the match on an abbreviation causing an additional compare operation to be performed starting with the abbreviation prefix character stored in said prefix region;

means responsive to a match being detected by said comparing means between said abbreviation prefix and a character in a table entry argument for causing subsequent characters applied to said comparing circuit to be taken from the normal region of said addressable storage means;

said punctuation indicator means being set by the detection of the period in the argument of the table entry which is matched on during said additional compare operation whereby, depending on the characters following the abbreviation in the language data sequence, one or the other of said recognizer means will generate an output.

10. A device for determining the end of a sentence in a sequence of coded language characters having coded symbols for terminal-type punctuation marks comprising:

shift register means having a plurality of stages and having an output from the last stage thereof;

input means for normally applying said coded language characters to said shift register means;

addressable storage means, means for selecting the address in the addressable storage means into which data is to be stored on from which it is to be read;

loading means for normally applying the successive outputs from the last stage of said shift-register means to successive address position in said storage means under control of said adder selecting means;

means for detecting a terminal-type punctuation symbol in said shift register means, means responsive to the detection of said symbol for inhibiting said input means from applying additional language data to said shift register means, for causing a ring-shift operation of said shift register, and for causing the existing contents of said shift register means to be fed into successive adder positions of said storage means;

means for storing a table in which is stored, in a systematic order, an entry having an argument representing each normal word of the input data sequence and an entry having an argument representing each possible form in which a terminal-type punctuation symbol may appear with the characters before and after it, there being function data following the argument data in each table entry;

means for comparing the language characters stored in said addressable storage means with the arguments of entries stored in said table;

a punctuation indicator means, means responsive to the detection of a terminal-type punctuation in the argument of a table entry for setting said punctuation indicator means;

means for detecting an end-of-sentence character in the function of a table entry;

first recognizer means responsive to a match being detected between language characters in said storage means and a table entry in the function of which an end-of-sentence character is detected for indicating, when said punctuation indicator means is set, that the end of a sentence has been detected;

second recognizer means responsive to a match being detected between langauge characters in said storage means and a table entry in the function of which an end-of-sentence character is not detected for indicating, when said punctuation indicator means is set, that the end of a sentence has not been detected;

and means responsive to an indication from said second recognizer means for restarting said input means and said loading means and for energizing said address selecting means to cause the language characters being applied to said addressable storage means by said loading means to be applied to successive address positions starting with the position following that in which the last language character matched-on during the preceding compare operation is stored.

References Cited by the Examiner

UNITED STATES PATENTS 3,167,740 1/1965 King ------------ 340—172.5

ROBERT C. BAILEY, *Primary Examiner.*

M. LISS, *Assistant Examiner.*